United States Patent [19]

Tamaki

[11] Patent Number: 4,601,575

[45] Date of Patent: * Jul. 22, 1986

[54] APPARATUS FOR MEASURING THE CHARACTERISTICS OF AN OPTICAL SYSTEM

[75] Inventor: Hiroshi Tamaki, Tokyo, Japan

[73] Assignee: Tokyo Kogaku Kikai Kabushiki Kaisha, Tokyo, Japan

[*] Notice: The portion of the term of this patent subsequent to Oct. 18, 2000 has been disclaimed.

[21] Appl. No.: 353,505

[22] Filed: Mar. 1, 1982

[30] Foreign Application Priority Data

Mar. 3, 1981 [JP] Japan .................................. 56-30223
Jun. 3, 1981 [JP] Japan .................................. 56-85490

[51] Int. Cl.⁴ .............................................. G01B 9/00
[52] U.S. Cl. ................................ 356/124; 356/125; 356/127
[58] Field of Search ............................... 356/124–127

[56] References Cited

U.S. PATENT DOCUMENTS

| | | | |
|---|---|---|---|
| 257,271 | 4/1981 | Tamaki ............................... | 356/127 |
| 3,880,525 | 4/1975 | Johnson .............................. | 356/127 |
| 4,007,990 | 2/1977 | McDevitt et al. .................. | 356/124 |
| 4,180,325 | 12/1979 | Humphrey ......................... | 356/127 |
| 4,275,964 | 6/1981 | Vassiliadis .......................... | 356/125 |
| 4,370,058 | 1/1983 | Trötscher et al. .................. | 356/125 |
| 4,410,268 | 4/1981 | Tamaki ............................... | 356/125 |

*Primary Examiner*—Bruce Y. Arnold
*Attorney, Agent, or Firm*—Brumbaugh, Graves, Donohue & Raymond

[57] ABSTRACT

An apparatus for measuring the optical characteristics of an optical system includes a light source, collimator means for collimating a beam of light from the light source, a mask means, a means for holding the optical system to be tested between the collimator means and the mask means, a detector, a calculator, and first beam splitting means. The mask means includes at least one mask provided in each optical path following the first beamsplitter means, each having a linear band group consisting of at least two parallel linear bands, with each mask disposed to provide a different orientation for the linear bands.

39 Claims, 27 Drawing Figures

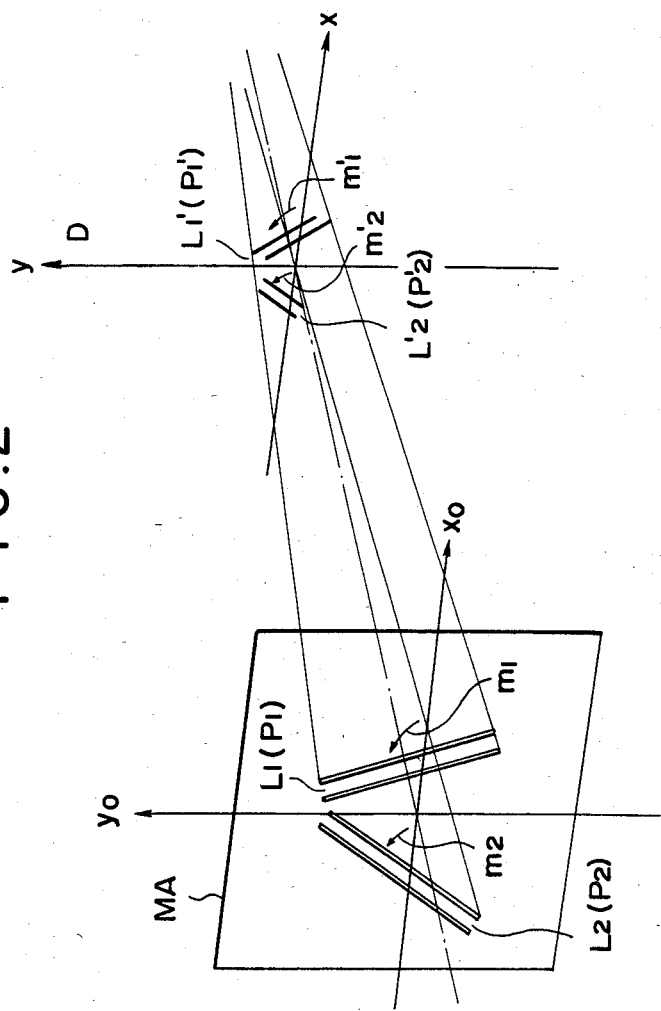

APPARATUS FOR MEASURING THE CHARACTERISTICS OF AN OPTICAL SYSTEM

BACKGROUND OF THE INVENTION

The present invention relates to an apparatus for automatically measuring the characteristics of an optical system, such as the spherical refractive power, the cylindrical refractive power and the orientation of the cylinder axis, and the prismatic refractive power and the orientation of the prism base. The principle and the examples of the present invention will hereinafter be described mainly with respect to a measurement for such characteristics of a spectacle lens. However, this does not necessarily mean that the present invention is applicable only to a so-called lensmeter which is adapted to measure the above characteristics of a spectacle lens, but the present invention is broadly applicable for measurements of the characteristics of a lens optical system used in optical instruments in general.

In recent years, various proposals have been made in the field of automatic lensmeters for automatically measuring the optical characteristics of a spectacle lens, such as the spherical refractive power, the cylindrical refractive power and the orientation of the cylinder axis and so on. For example, U.S. Pat. No. 3,880,525 discloses an apparatus in which a parallel light beam is projected through a lens along the optical axis of the apparatus and the optical characteristics are determined by the deflection of the light which has passed through the lens. For the purpose, the apparatus includes a mask located behind the lens and having small apertures which are offset from the optical axis of the lens, and a detecting plane which is spaced apart by a predetermined distance along the optical axis from the mask so that the locations on the detecting plane of the projections of the apertures are detected. The locations thus detected are compared with the locations of the apertures on the mask to calculate the direction and the amount of deflection of the light beam which has passed through the lens. In order to obtain adequate information, the mask must be provided with at least three such apertures.

The apparatus as proposed by the U.S. Patent is considered as being disadvantageous in that it is required to determine exactly which one of the projections on the detecting plane corresponds to each specific one of the apertures in the mask. Further, the apertures in the mask must be in a two-dimensional arrangement so that the light beams which have passed through the apertures in the mask are not coplanar with each other. Thus, a two-dimensional scanning is required at the detecting plane and the apparatus therefore becomes expensive as a whole. Complicated and expensive operation circuits are required because it is necessary to solve five simultaneous equations based on the informations derived from the locations of at least three apertures. The apparatus has a further significant disadvantage in that the image detection and measurement are disenabled by foreign matters such as dust on the lens to be tested or the detecting plane since the images are detected in the form of a spot-like image.

In order to solve the problems of processing bulky informations inherent to such two-dimensional detection, the U.S. Pat. No. 4,180,325 proposes to pass the light beam from the mask through a rotatable disc having a special pattern comprised of transparent and opaque portions. The disc pattern functions to intermittently interrupt the light beams so that the light beams arrive at the detecting plane respectively at different timings to thereby eliminate the necessity for discriminating the light beams. However, in this apparatus, the pattern on the disc is very complicated and the detection of the angular position of the disc is of a significant importance. Therefore, serious problems are encountered in providing an accurate pattern on the disc and detecting the angular position of the disc.

SUMMARY OF THE INVENTION

It is the first object of the present invention to provide an apparatus for measuring the optical characteristics of an optical system in which detection and succeeding operations can relatively simply be performed.

The second object of the present invention is to provide an apparatus for measuring the optical characteristics of an optical system in which measurement can more precisely be made with operations therefrom being processed more rapidly.

The third object is to provide an apparatus for measuring the optical characteristics of an optical system which includes no movable mechanical part and can simply be assembled and adjusted with less error inherent to aging.

The fourth object is to provide an apparatus for measuring the optical characteristics of an optical system in which the spherical refractive power, the cylindrical refractive power and the orientation of cylinder axis of an optical system to be tested can be measured and calculated simultaneously and independently of the prismatic refractive power and the orientation of the prism base of the same, thus, at higher measuring and processing speeds.

In accordance with the present invention, the apparatus is based on a principle of the optics on which planar light beams passed through an optical system and selected by the use of a beam limiting mask having two linear patterns (said planar light beams being twisted if there is a cylindrical refractive power) can be varied in spacing, orientation and inclination depending on the optical characteristics of the optical system, but never in flatness (linearity in the projected image).

In one aspect of the present invention, an apparatus for measuring the optical characteristics of an optical system is provided which comprises collimator means for converting a bundle of rays from a source of light into a parallel pencil of rays, selection means for selecting part of the rays from said collimator means, means for holding an optical system to be tested between said collimator means and said selection means, detection means for detecting the selected rays from said selection means, and operation means for calculating information from said detection means to determine the optical characteristics of said optical system, said apparatus being characterized in that said selection means includes a beam selecting pattern consisting of two groups of parallel linear bands arranged in different orientations without any intersection, each of said groups being comprised of at least two parallel linear bands.

In another aspect of the present invention, such an apparatus is further characterized in that it comprises first optical path splitting means for dividing the light beams from said optical system to be tested into at least two optical paths, each of which includes an least one selection means having a beam selecting pattern of at least two parallel linear lines, the linear line pattern in said selection means being different in orientation from one to another.

In still another aspect of the present invention, such an apparatus is further characterized in that it comprises means for rotating a pencil of rays passed through said optical system to be tested relative to said selection means in a plane intersecting an optical axis for measurement, and that said selection means includes a beam selecting pattern consisting of at least two parallel linear bands.

BRIEF DESCRIPTION OF THE DRAWINGS

The principle and embodiments of the present invention will now be described with reference to the accompanying drawings, in which:

FIGS. 1 and 2 are perspective views of a projecting system for explaining the principle of the present invention;

FIG. 21 is a view of an optical arrangement which is the eighth embodiment of the present invention;

DESCRIPTION OF THE PREFERRED EMBODIMENTS

Figure 1:
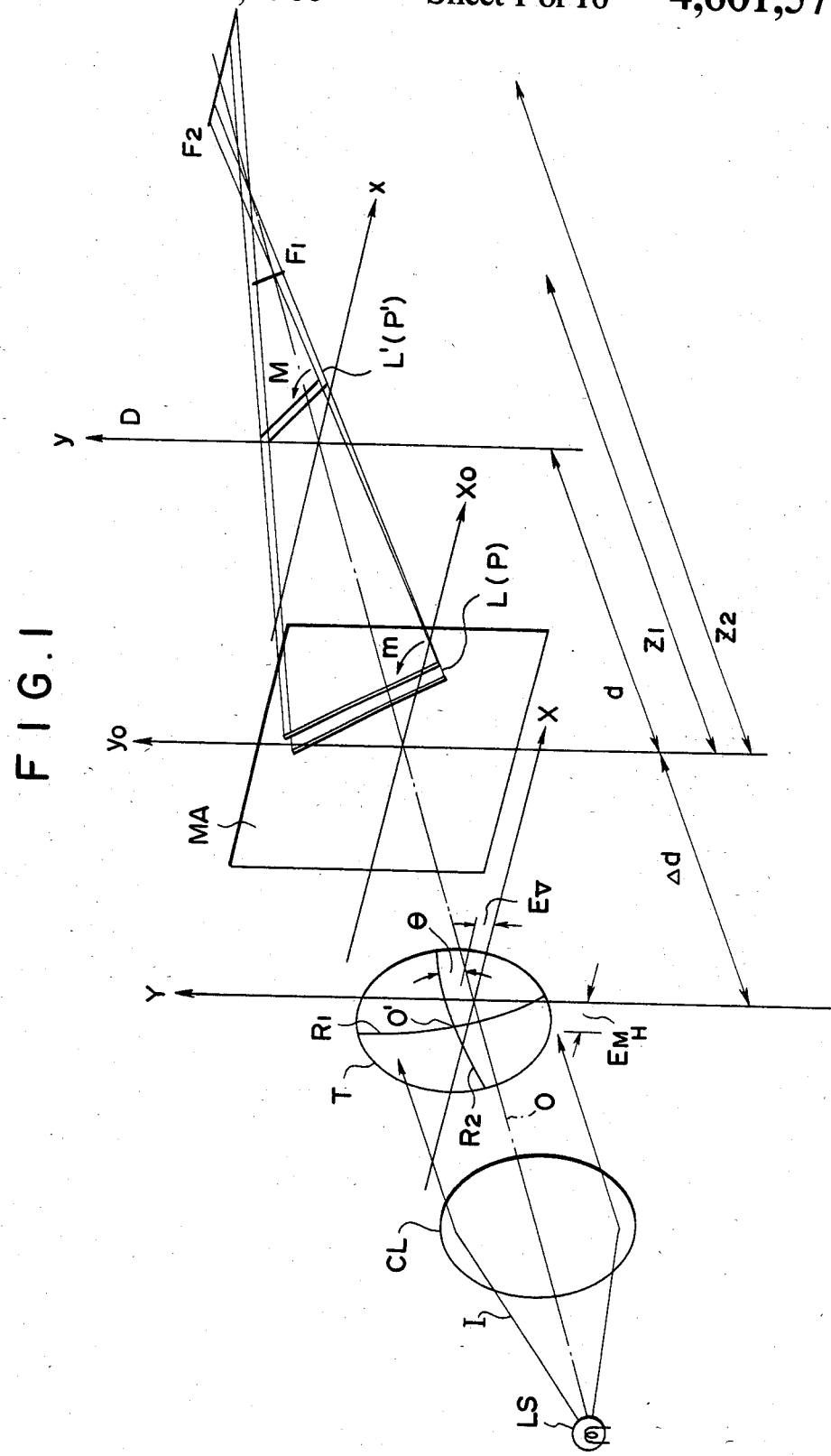

When a parallel pencil of rays is incident on the spherical lens, cylindrical lens or astigmatic lens, the rays are refracted depending on the refractive characteristics of the lens. It is well known that the term "spherical lens" herein is a lens comprised of two spherical faces. The term "cylindrical lens" is a lens which includes at least one cylindrical face. The term "astigmatic lens" is one which includes at least one toroidal face. The term "toroidal face" used herein includes principal meridians having maximum and minimum radiuses of curvature which intersect with each other. The spherical face is considered to have two curved surfaces of the same radius of curvature which intersect with each other. On the other hand, the cylindrical face is recognized to have two curved surfaces intersecting with each other, one of the curved surfaces having infinite radius of curvature. Therefore, the spherical and cylindrical faces can be considered to be specific examples of a toroidal face. The principle of the present invention will be described with respect to an astigmatic lens including the toroidal face, and will be explained to deal with the spherical and cylindrical lenses as specific cases.

Where a parallel pencil of rays is incident on an astigmatic lens to be tested and, if the incident beam is a circular bundle of rays, it is known that the emitted beam is an elliptical bundle of rays. If the incident beam is a linear bundle of rays, the emitted beam becomes a planar beam (the latter being twisted if there is a cylindrical refractive power). The planar beam can be varied in orientation and inclination depending on the optical characteristics of the optical system, but has a basic property in that an image projected onto a plane perpendicular to said incident parallel rays is maintained linear at all times. The refractive characteristics used herein includes refractive powers of two principal meridians having maximum and minimum radii of curvature which form the toroidal face of a lens to be tested, angles of said two principal meridians relative to a predetermined reference line, and a prismatic amount representing an offset between the geometric and optical centers of the lens to be tested or an offset of the lens to be tested in setting.

However, where various limited pencils of rays are incident on and pass through a mask disposed just forwardly of a lens to be tested, other refractive characteristics, that is, two shape factors in both the refractive directions are added.

These additional refractive characteristics mean that the relationship between the incident and emitted pencil of rays can be varied by changing at least one of the radius of curvature in the first face, the central thickness, and the refractive index of a lens to be tested. The shape factors provide a useless unreliability to the refractive characteristics to be measured according to the present invention. The additional shape factors can be avoided by limiting the refracted pencil of rays after passed through the lens to be tested. Namely, this can be accomplished by causing a general circular bundle of parallel rays to be incident on a lens to be tested and causing an elliptical bundle of rays refracted depending on the refractive characteristics of the lens to pass and limit through a certain apertured pattern. By detecting the limited bundle of rays, one can know the refractive characteristics independently of the shape factors. In the present invention, therefore, mask means having an apertured pattern must be located rearwardly of a lens to be tested.

Referring to FIG. 1, a beam of light 1 emitted from a source of light LS is converted into a parallel pencil of rays by means of a collimator lens CL. A lens to be tested T has a first principal meridian $R_1$ having minimum radius of curvature and a second principal meridian $R_2$ having maximum radius of curvature. The lens T is disposed in a plane X-Y perpendicular to an optical measuring axis O such that the optical axis O' of the lens is positioned at a location offset by $E_V$ along Y-axis and $E_mH$ along X-axis from the optical measuring axis O in the same plane X-Y and that the meridian $R_2$ is inclined relative to X-axis by an angle $\theta$. Further, a mask MA is disposed on the optical measuring axis O rearwardly of the lens T at a distance $\Delta d$ with the center thereof being coincident with the optical axis O.

This mask MA is formed with such an opening that a group of at least two parallel linear bands L with a pitch P intersects the X-axis at an angle m.

The pencil of rays, which has passed through the lens T and been refracted dependent on the refractive characteristics thereof, is limited by the mask MA to form a limited light beam which has passed only through the opening pattern. This limited light beam is converged on positions corresponding respectively to the focal lines $F_1$, $F_2$ of the first and second principal meridians $R_1$, $R_2$ in the lens to be tested T. There is a detection plane X-Y between the focal line $F_1$ and the mask MA. The group of parallel linear bands L which corresponds to the opening pattern of the mask MA is changed to a group of parallel linear bands L' projected with a pitch P', the angle thereof relative to x-axis being changed to M. This angle M is represented by the following equation:

$$M = \frac{m\left(1 - d\left(\frac{\sin^2\theta}{Z_1} + \frac{\cos^2\theta}{Z_2}\right)\right) + d\left(\frac{1}{Z_2} - \frac{1}{Z_1}\right)\sin\theta\cos\theta}{md\left(\frac{1}{Z_2} - \frac{1}{Z_1}\right)\sin\theta\cos\theta - d\left(\frac{\cos^2\theta}{Z_1} + \frac{\sin^2\theta}{Z_2}\right) + 1} \quad (1)$$

Further, the pitch P' is represented by the following equations:

$$P' = \left| \frac{\left\{d\left(\frac{1}{Z_1} + \frac{1}{Z_2}\right) - \frac{d^2}{Z_1 Z_2} - 1\right\}}{md\left(\frac{1}{Z_2} - \frac{1}{Z_1}\right)\sin\theta \cdot \cos\theta - d\left(\frac{\cos^2\theta}{Z_1} + \frac{\sin^2\theta}{Z_2}\right) + 1} \right| \sqrt{\frac{m^2+1}{M^2+1}} \cdot P \quad (2)$$

In the above equations, $Z_1$ is a distance from the mask MA to the first focal line $F_1$ and $Z_2$ is a distance therefrom to the second focal line $F_2$.

On analyzing the changes in the group of parallel linear bands only with respect to the inclination and pitch from the above equations (1), (2), it is understood that such changes are related only by the refractive powers of the two meridians and the inclination angle thereof, but not by the prismatic amount relating to the offsets $E_H$ and $E_V$. This means that the prismatic amount can be calculated by operation means completely different from that of the refractive power in the lens to be tested, resulting in simplified calculation and reduced time required to operate.

In practically measuring the refractive characteristics of a lens to be tested T from changes in inclination and pitch of the parallel linear line group based on the equations (1) and (2), it is understood that the equations cannot be solved only by the changes in one parallel linear band group since there are three unknown quantities $Z_1$, $Z_2$ and $\theta$ in the equations (1) and (2). It is actually required also to know changes in inclination and pitch of the other parallel linear band group. A construction for attaining such requirement is shown in FIG. 2. Mask MA shown in FIG. 2 has a opening pattern which includes a group of two parallel linear bands $L_1$ sloped by an angle $m_1$ with a pitch $P_1$ and another group of two parallel linear bands $L_2$ inclined by an angle $m_2$ with a pitch $P_2$. After passed through the openings on the mask, the bundle of rays is imaged on a detection plane D to form a group of two projected parallel linear bands $L_1'$ slanted by an angle $m_1'$ with a pitch $P_1'$ and another group of two projected parallel linear bands $L_2'$ sloped by an angle $m_2'$ with a pitch $P_2'$. From these two groups of projected parallel linear bands are obtained equations corresponding to the above equations (1) and (2) with the total number of equations being equal to four. Accordingly, said unknown quantities $\theta$, $Z_1$ and $Z_2$ can be calculated. If to solve the quadratic equations (1) and (2) for obtaining the value $Z_1$, $Z_2$ and $\theta$ leads to a complicated and expensive processing mechanism and an increased processing time, an intermediate operation process may be made as will be described hereinafter.

Figure 3B:
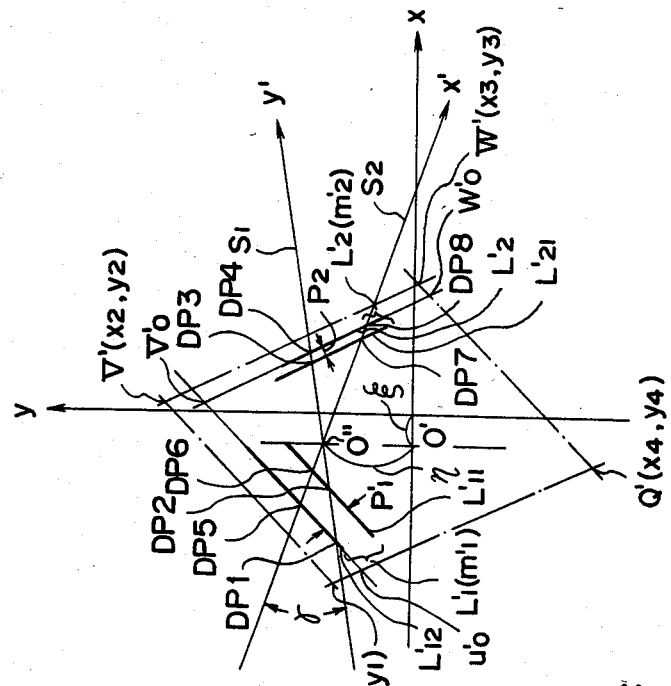
FIGS. 3a, 3b and 3c are schematic views showing relationships between projected mask patterns and line sensors to prove that the optical characteristics can be measured in accordance with the present invention.
Figure 3A:
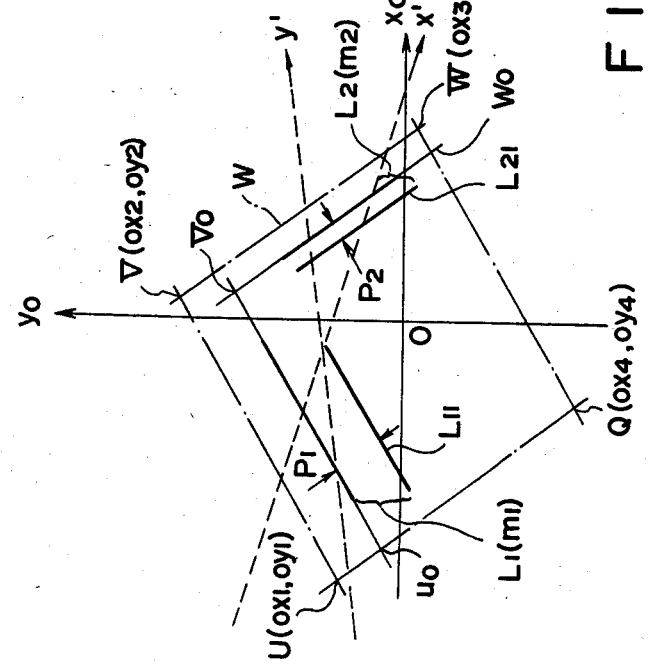

FIG. 3a shows parallel linear band groups $L_1$ and $L_2$ which are formed in the mask MA shown in FIG. 2. It is the same as in FIG. 2 that the band group $L_1$ is sloped by the angle $m_1$ with the pitch $P_1$ while the band group $L_2$ is inclined by the angle $m_2$ with the pitch $P_2$. It is now supposed that there are a line $\overline{UV}$ spaced apart from the parallel to one linear band $L_{11}$ of the parallel linear band group $L_1$ by a distance $eP_1$ and another line $\overline{QW}$ spaced apart from and parallel to the same band by a distance $fP_1$.

It is further assumed that there are a line $\overline{VW}$ spaced away from and parallel to one linear band $L_{21}$ of the parallel linear line group $L_2$ by a distance $gP_2$ and another line $\overline{UQ}$ spaced away from and parallel to the same linear band $L_{21}$ by a distance $hP_2$. These parallel lines $\overline{UV}$, $\overline{QW}$, $\overline{VW}$ and $\overline{UQ}$ defines an imaginary parallelogram UVWQ having four corners which are positioned in x-y coordinate system at imaginary coordinates $U(_0x_1, _0y_1)$, $V(_0x_2, _0y_2)$, $W(_0x_3, _0y_3)$ and $Q(_0x_4, _0y_4)$.

FIG. 3b shows groups of parallel linear bands $L_1'$, $L_2'$ which are projected onto the detection plane by the bundle of rays passed through the parallel linear band group $L_1$, $L_2$ that are shown in FIG. 3a as opening pattern. It is the same as in FIG. 2 that the group $L_1'$ is inclined by the angle $m_1'$ with the pitch $P_1'$ while the group $L_2'$ is sloped by the angle $m_2'$ with the pitch $P_2'$. Assuming that these projected parallel linear band groups are detected by linear sensors $S_1$ and $S_2$ intersecting with each other at an angle $\gamma$ and having its origin $O''$ which is spaced apart from and parallel to an origin $O'$ of x'-y' coordinate by a distance $\xi$ along x'-axis and by a distance $\eta$ along y'-axis, the linear sensor $S_1$ would detect the projected parallel linear band groups at detection points DP1, DP2, DP3 and DP4 while the linear sensor $S_2$ would detect the projected parallel linear line groups at detection points DP5, DP6, DP7 and DP8. Results obtained at the detection points DP2 and DP6 are used to calculate the equations with respect to one linear line $L_{11}'$ of the projected parallel linear band groups while results from the detection points DP3 and DP7 are utilized to operate the equations with reference to one linear band $L_{21}'$. Similarly, results obtained respectively at the detection points DP1, DP5 and DP4, DP8 are respectively employed to calculate the equations with respect to the respective linear bands $L_{12}'$ and $L_{22}'$. At the same time, the pitches $P_1'$ and $P_2'$ can be calculated with respect to the respective linear bands $L_{11}'$, $L_{12}'$ and $\underline{L_{21}'}$, $L_{22}'$. Furthermore, there can be supposed a line $\overline{U'V'}$ spaced apart from and parallel to the linear band $L_{11}'$ with a pitch $eP_1'$ which is obtained by multiplying the pitch $P_1'$ by the same magnification e as in FIG. 3a. There can similarly be assumed a line $\overline{Q'W'}$ spaced away from and parallel to the linear band $L_{11}'$ with a pitch $fP_1'$. There can be also derived lines $\overline{V'W'}$ and $\overline{U'Q'}$ spaced away from and parallel to the linear band $L_{21}'$ with the respective pitches $gP_2'$ and $hP_2'$. These parallel lines $\overline{U'V'}$, $\overline{Q'W'}$, $\overline{V'W'}$ and $\overline{U'Q'}$ defines an imaginary parallelogram U'V'W'Q'. Assuming that the imaginary parallelogram has four corners located respectively at imaginary coordinates $U'(x_1, y_1)$, $V'(x_2, y_2)$, $W'(x_3, y_3)$ and $Q'(x_4, y_4)$ in x-y coordinate system, this imaginary parallelogram U'V'W'Q' of FIG. 3b corresponds to the imaginary parallelogram UVWQ shown in FIG. 3a. Such a change relates directly to that of the refractive characteristics of a lens to be tested.

Now, the following coefficients and equations are defined with respect to the imaginary corners of the parallelograms.

$$A_{ij} = (_0x_i - x_i) - (_0x_j - x_j) \quad (3a)$$
$$A_{ik} = (_0x_i - x_i) - (_0x_k - x_k)$$
$$B_{ij} = (_0y_i - y_i) - (_0y_j - y_j)$$
$$B_{ik} = (_0y_i - y_i) - (_0y_k - y_k)$$
$$C_{ij} = _0x_i - _0x_j$$
$$C_{ik} = _0x_i - _0x_k$$
$$D_{ij} = _0y_i - _0y_j, \; D_{ik} = _0Y_i - _0Y_k$$

where j or k is taken with respect to a reference i. From these imaginary corners there can be derived twelve combinations.

By the use of the above equation (3a), the values $Z_1$ and $Z_2$ relating to the refractive powers of two principal meridians can be represented by the following quadratic equation:

$$(C_{ik}D_{ij} - C_{ij}D_{ik})(d/z)^2 + (A_{ij}D_{ik} + B_{ik}C_{ij} - A_{ik}D_{ij} - B_{ij}C_{ik})(d/z) + (A_{ik}B_{ij} - A_{ij}B_{ik}) = 0 \quad (3b)$$

where the terms encoded by parentheses in the above equation are defined as follows:

$$[p,q] = p_{ij}q_{ik} - q_{ij}p_{ik}$$

$$[p,q] = -[q, p]$$

If p and q in such a definition are respectively derived either of A, B, C or D, the equation (3b) can be replated by:

$$[C,D](d/z)^2 + \{[B,C] - [A,D]\}(d/z) + [A,B] = 0 \quad (3c)$$

where d is a distance between the mask MA and the ditection plane D as shown in FIG. 1, and z is a distance between the mask MA and the focal lines of the lens to be tested.

Thus, by detecting the respective pitches $P_1'$, $P_2'$ and inclinations $m_1'$, $m_2'$ in two groups of projected parallel linear lines $L_1'$ and $L_2'$ to form the imaginary parallelogram as shown in FIG. 3b and solving the quadratic equation (3) based on information to the four corners of said parallelogram, two roots $z_1$ and $z_2$ can be obtained. Based on these roots $z_1$ and $z_2$, the refractive powers $D_1$ and $D_2$ of the first and second principal meridians $R_1$ and $R_2$ in the lens T to be tested can be calculated respectively as follows:

$$D_1 = \frac{1/z_1}{\Delta d/z_1 - 1} \; D_2 = \frac{1/z_2}{\Delta d/z_2 - 1} \quad (4)$$

Further, an angle $\widehat{H}$ of the cylinder axis is placed in a relation with the angle $\theta$ which is included between the first principal maridian $R_1$ and x-axis: $\widehat{H} = \theta + 90°$. This angle $\widehat{H}$ can be obtained from the following equation:

$$\widehat{H} = \tfrac{1}{2} \tan^{-1}\left( \frac{[B,D] - [A,C]}{[A,D] + [B,C]} \right) + 90° \quad (5)$$

Although the imaginary parallelograms have been obtained by multiplying the respective pitches $P_1$, $P_2$, $P_1'$ and $P_2'$ by the optional magnifications e, f, g and h in FIGS. 3a and 3b, the calculating process can be simplified actually by the use of imaginary parallelograms $U_0V_0W_0Q$ and $U_0'V_0'W_0'Q'$ when the magnification e and g are set to be equal to one, respectively.

Figure 4:
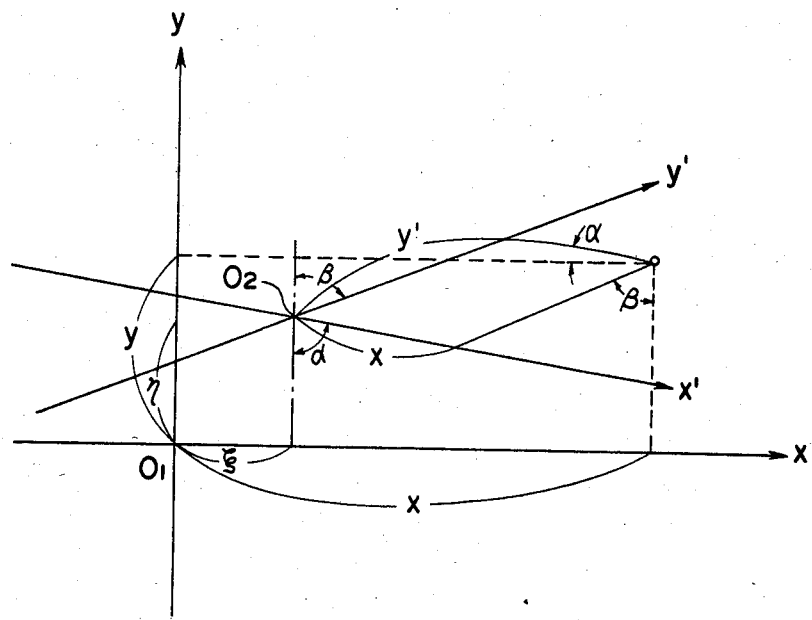
FIG. 4 is a view showing a relationship between a perpendicular and oblique coordinate systems.

Although the coordinates of the respective corners on the imaginary parallelograms have been explained with respect to the perpendicular coordinate systems $x_0$-$y_0$ and x-y, there can be taken an oblique coordinate system x'-y' along the disposition of the linear sensors $S_1$ and $S_2$. This oblique coordinate system x'-y' is shifted from the perpendicular coordinate system x-y such that x-axis and y-axis are intersected respectively by x'-axis and y'-axis with the respective angles $\alpha$ and $\beta$ and that the origin $O_2$ of x'-y' coordinate system is offset from the origin $O_1$ of x-y coordinate system by distances $\xi$ and $\eta$ along the s- and y-axes, respectively as shown in FIG. 4.

Such coordinate shift from the x'-y' system to the x-y system can be represented by the following equations:

$$x = x'\sin\alpha + y'\sin\beta + \xi \atop y = y'\cos\beta - x'\cos\alpha + \eta \Big\} \quad (6)$$

There is known the following equation from the above equation group (3)

$$A_{ij} = (_0x_i - x_i) - (_0x_j - x_j)$$

Substituting the equation (6) for the last-mentioned equation, $$A_{ij} = \{(_0x'_i\sin\alpha + _0y'_i\sin\beta + \xi) - (x'_i\sin\alpha + y'_i\sin\beta + \xi)\} - \quad (7a)$$
$$\{(_0x'_j\sin\alpha + _0y'_j\sin\beta + \xi) - (x'_j\sin\alpha - y'_j\sin\beta + \xi)\}$$
$$= \sin\alpha\{(_0x'_i - x'_i) - (_0x'_j - x'_j)\} +$$
$$\sin\beta\{(_0y'_i - y'_i) - (_0y'_j - y'_j)\}$$
$$= A'_{ij}\sin\alpha + B'_{ij}\sin\beta$$

Further, there is known:

$$B_{ij} = (_0y_i - y_i) - (_0y_i - y_i).$$

Similarly, the following equation is obtained:

$$B_{ij} = \cos\beta\{(_0y'_i - y'_i) - (_0y'_j - y'_j)\} - \quad (7b)$$
$$\cos\alpha\{(_0x'_i - x'_i) - (_0x'_j - x'_j)\}$$
$$= B'_{ij}\cos\beta - A'_{ij}\cos\alpha$$

Similarly, the following equations are also obtained:

$$C_{ij} = C'_{ij}\sin\alpha + D'_{ij}\sin\beta \quad (7c)$$

$$D_{ij} = D'_{ij}\cos\beta - C'_{ij}\cos\alpha \quad (7d)$$

Obtaining [C, D]; [B, C]; [A, D]; [A, B] from the equations (7a)–(7d), $$[C,D] = C_{ij}D_{ik} - D_{ij}C_{ik}$$
$$= (C'_{ij}\sin\alpha + D'_{ij}\sin\beta)(D'_{ik}\cos\beta - C'_{ik}\cos\alpha) -$$
$$(D'_{ij}\cos\beta - C'_{ij}\cos\alpha)(C'_{ik}\sin\alpha + D'_{ik}\sin\beta)$$
$$= (\sin\alpha\sin\beta + \cos\alpha\sin\beta)[C',D']$$

Similarly, $$[B,D] = (\sin\alpha\sin\beta + \sin\beta\cos\alpha)[A',B']$$

$$[A,D] = \sin\alpha\cos\beta[A',D'] - \sin\alpha\cos\alpha[A',C'] + \sin\beta\cos\beta[B',D'] - \sin\beta\cos\alpha[B',C']$$

$$[A,B] = (\sin\alpha\cos\beta + \cos\alpha\sin\beta)[A',B']$$

and $$[B,C] - [A,D] = (\sin\alpha\cos\beta + \cos\alpha\sin\beta)\{[B',C'] - [A'D']\}.$$

Therefore, the equation (3c) is changed as follows:

$$\sin(\alpha+\beta) \times \{[C',D'](d/z)^2 + ([B',D'] - [A'D'])(d/z) + [A',B']\} = 0 \quad (8)$$

In this equation (8), the term enclosed by a brace is a quadratic equation of the same type as the equation (3c). It is therefore understood that the quadratic equation (3c) is an invariable equation independently of all of the coordinate systems. This means that two linear sensors used as detectors can be disposed with very large freedom. Namely, two linear sensors can be located on the x'-y' coordinate system rather than the x-y coordinate system and the perpendicularly intersecting coordinate axes. Accordingly, such a disposition or location can be made independently of accuracy in measurement even if no attention is drawn to the precise intersections and optical axis alignment of the linear sensors. In actual measurements, the patterns of parallel linear bands $L_1$ and $L_2$ prior to the insertion of a lens to be tested into the optical measuring system are previously detected by the use of the linear sensors $S_1$ and $S_2$ located respectively on the x'- and y'-axes in the obliquely intersecting coordinate system x'-y'. The resulting imaginary parallelogram UVWQ is used as a reference imaginary parallelogram. Thereafter, a lens to be tested is inserted into the optical measuring system to form a projected imaginary parallelogram U'V'W'Q'. By comparing the projected imaginary parallelogram with the reference imaginary parallelogram, the refractive characteristics of the lens to be tested can be obtained. At this time, both the parallelograms are considered only in the oblique coordinate system x'-y' which is an invariable equation independently of the other equations for calculating the refractive power among the refractive characteristics of the lens, as described hereinbefore. In accordance with the present invention, therefore, the linear sensors $S_1$ and $S_2$ can be positioned with no adjustment in assembling and maintenance.

The orientation of cylinder axis in the lens to be tested can be given by the equation (5) which is used in the perpendicular coordinate system. However, where the sensors are disposed in the oblique coordinate system x'-y', the orientation is first obtained by the following equation with respect to the oblique coordinate system with the result being used to calculate the cylinder axis in the perpendicular coordinate system:

$$\theta = \tfrac{1}{2}\tan^{-1} \times \left( \frac{\cos 2\beta[B',D'] - \cos(\alpha-\beta) \cdot ([A',D'] + [B',C']) + \cos 2\alpha[A',C']}{\sin 2\alpha[B',D'] + \sin(\alpha-\beta)([A',D'] + [B',C']) - \sin 2\alpha[A',C']} \right) \quad (9)$$

The cylinder axis (H) can be obtained from the aforementioned equation:

$$(H) = \theta + 90°$$

Figure 5:
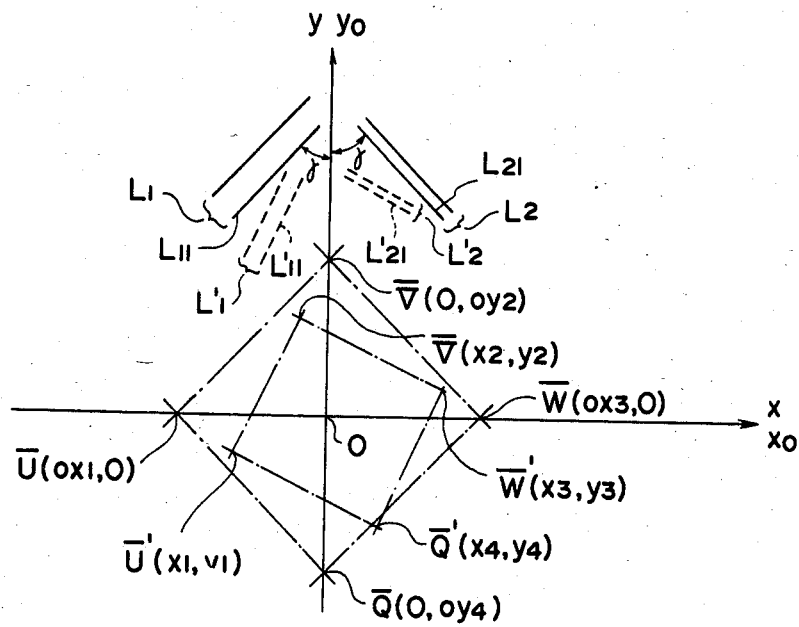
FIG. 5 is a view showing a relationship between a mask pattern and an imaginary parallelogram.

Measurement of prism power will now be described with reference to FIG. 5.

Prism values in the perpendicular coordinate systems $x_o$-$y_o$ and x-y are calculated such that an imaginary parallelogram $\overline{UVWQ}$ is defined by linear lines $\overline{UV}$, $\overline{WQ}$, $\overline{VW}$, $\overline{UQ}$ which are drawn at the respective distances $e'P_1$, $f'P_1$, $g'P_2$ and $h'P_2$ from the respective linear bands $L_{11}$ and $L_{21}$ of the parallel linear band groups $L_1$ and $L_2$ which are disposed symmetrically relative to $y_o$-axis by the same angle with the respective pitches $P_1$ and $P_2$, the four corners of the above imaginary parallelogram being placed on the $x_o$- and $y_o$-axes. Namely, if the imaginary parallelogram is located symmetrically relative to the optical measuring axis O, the center thereof corresponds to the optical measuring axis O. Subsequently, a lens to be tested is measured to detect projected groups of parallel linear band $L_1'$ and $L_2'$ with linear lines $\overline{U'V'}$, $\overline{W'Q'}$, $\overline{V'W'}$ and $\overline{U'Q'}$ being similarly drawn at the respective distances $e'P_1'$, $f'P_1'$, $f'P_2'$ and $h'P_2'$ from the respective linear bands $\overline{L_{11}'}$ and $\overline{L_{21}'}$ to form an imaginary parallelogram $\overline{U'V'W'Q'}$. This imaginary parallelogram includes four corners which are positioned at the respective coordinates $\overline{U}'(x_1, y_1)$, $\overline{V}'(x_2, y_2)$, $\overline{W}'(x_3, y_3)$ and $\overline{Q}'(x_4, y_4)$ of the x-y coordinate system. By the use of these coordinates of the four corners, a horizontal prism quantity $P_H$ and vertical prism quantity $P_V$ are represented by the following equations:

$$P_H = \frac{\sum_{i}^{4} x_1}{4d} \times 10^2 \tag{10}$$

$$P_V = \frac{\sum_{i}^{4} y_i}{4d} \times 10^2$$

where d is a distance between the ditection plane and the surface of the mask.

For measurements in the oblique coordinate system x'-y', based on the principle of symmetry as in the perpendicular coordinate system, original imaged points $(_ox_1, {_o}y_1)$, $(_ox_2, {_o}y_2)$, $(_ox_3, {_o}y_3)$ and $(_ox_4, {_o}y_4)$ may be set to fulfill the following conditions:

$$_ox_1 + {_o}x_2 + {_o}x_3 + {_o}x_4 = 0 \tag{12}$$
$$_oy_1 + {_o}y_2 + {_o}y_3 + {_o}y_4 = 0$$

Since the horizontal and vertical prism quantities $P_H$ and $P_V$ are respectively obtained from the equation (10), the equation (6) can be used to change the equation (12) as follows:

$$\sum_{i}^{4} {_o}x'_i \sin\alpha + \sum_{i}^{4} {_o}y'_i \sin\beta + 4\xi = 0 \tag{13}$$

$$\sum_{i}^{4} {_o}y'_i \cos\beta - \sum_{i}^{4} {_o}x'_i \cos\alpha + 4\eta = 0$$

The equation (6) can be also used to change the equation (10) as follows:

$$4P_H d \times 10^{-2} = \sum_{i}^{4} x'_i = \sum_{i}^{4} x'_i \sin\alpha + \sum_{i}^{4} y'_i \sin\beta + 4\xi \tag{14}$$

$$4P_V d \times 10^{-2} = \sum_{i}^{4} y'_i = \sum_{i}^{4} y'_i \cos\beta - \sum_{i}^{4} x'_i \cos\alpha + 4\eta$$

Because there is a difference between the coordinate $(_ox_i', {_o}y_i')$ of the original $(_ox_i, {_o}y_i)$ in the oblique coordinate system when a lens to be tested is absent and the coordinate $(x_i', y_i')$ of the measurement in the oblique coordinate system when the lens is inserted in the measuring system, the following equations can be obtained from the previous equations (13) and (14);

$$P_H = \frac{\sin\alpha \sum_{i}^{4}(x'_i - {_o}x'_i) + \sin\beta \sum_{i}^{4}(y'_i - {_o}y'_i)}{4d} \times 10^2$$

$$P_V = \frac{\cos\beta \sum_{i}^{4}(y'_i - {_o}y'_i) - \cos\alpha \sum_{i}^{4}(x'_i - {_o}x_i)}{4d} \times 10^2$$

These equations represents the prism values.

According to the present invention, the refractive power of a lens to be tested can be calculated from the invariable equation independently of all of the coordinate systems. However, any coordinate change between the oblique and perpendicular coordinate systems is required to obtain the cylinder axis and prism value of the lens to be tested so that any change in the equations (12) and (15) will also be required. If there is a complicated operation mechanism, measured coordinates (x', y') in the oblique coordinate system may be changed to those of the perpendicular coordinate system by the use of the equation (6). Thereafter, astigmatic axis and prism value can be calculated by utilizing the equations (5) and (10) which can be used in the perpendicular coordinate system.

According to the present invention, thus, an imaginary parallelogram which is disposed symmetrically relative to the optical axis O is previously formed based on the parallel linear band groups $L_1$ and $L_2$ on the mask when no lens to be tested is inserted in the optical measuring system. Thereafter, a lens to be tested is inserted in the optical measuring system so that the parallel linear band images will be projected to form a similar projected imaginary parallelogram. Consequently, prism values can be calculated. This means that such a calculation can solely be made independently of the refractive powers and inclinations of the first and second principal meridians in the lens to be tested. This is very advantageous over the prior art lensmeter in which the prism values cannot be calculated without knowing the refractive characteristics of a lens to be tested. In such a manner, the present invention provides very reduced time required to operate the refractive characteristics and prism values of the lens to be tested since both the steps for calculating them are simultaneously and independently made.

The present invention is not limited to a so-called lensmeter for measuring the characteristics of spectacle lenses, but broadly applicable to any apparatus for measuring the optical characteristics of optical systems.

Figure 3C:
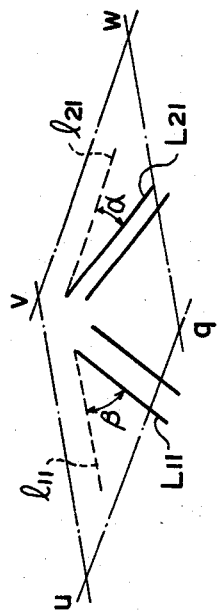

Although a process has been described which forms an imaginary parallelogram by drawing imaginary lines spaced apart from and parallel to the linear bands $L_{11}$ and $L_{21}$ of the linear band groups with a pitch when is obtioned by the pitch in said groups multiplied by n, the present invention is not limited to said a method and can be accomplished also by such a method as seen from FIG. 3c in which imaginary linear lines $l_{11}$ and $l_{21}$ are defined to have the respective angles and relative to the respective linear band $L_{11}$ and $L_{21}$. Based on the so formed imaginary linear lines $l_{11}$ and $l_{21}$, there may be formed an imaginary parallelogram uvwq. This does not depart from the principle of measurement according to the present invention.

Embodiments of an apparatus for measuring the refractive power of an optical lens which is constructed based on the aforementioned principle of measurement of the present invention will now be described with reference to the accompanying drawings.

Figure 6:
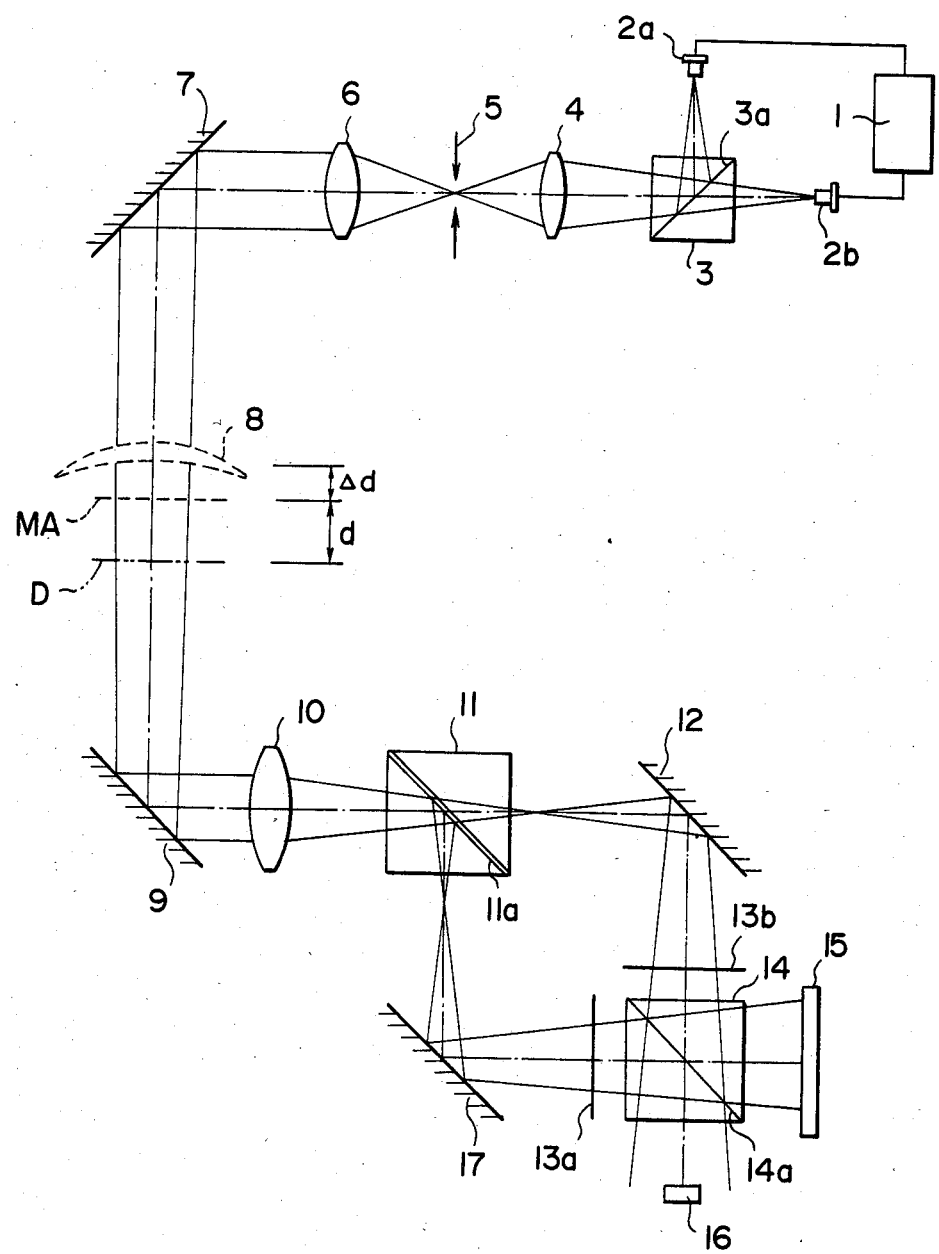
FIG. 6 is a schematic view of an optical system which is one embodiment of the present invention.

FIG. 6 shows the arrangement of an optical system constructed according to the present invention. In this figure, 2a and 2b designate sources of light which are alternately driven by a drive circuit 1 to respectively emit lights having different wavelengths, such as LED and the like.

A beam of light emitted from the source of light 2a is reflected by a wavelength selecting reflective-transmissive film 3a in a dichroic prism 3 and then incident on a relay lens 4. On the other hand, a beam of light from the light source 2b is transmitted through the same reflective-transmissive film 3a in the dichroic lens 3 and then incident on the relay lens 4. The light beams are incident on the relay lens 4 and condensed to a pin-hole 5. This pin-hole 5 serves to provide appropriate dimensions of apparent light sources in consideration with light quantity and diffraction in measuring. The diameter of the pin-hole is in the order of 0.1 to 0.3 mm. The beam of light emitted from the pin-hole 5 is converted into a parallel pencil of rays by means of a collimator lens 6 and then reflected downwardly at a reflective mirror 7 to be incident on a lens to be tested 8 which is held by any suitable holding means (not shown). The light beam from the lens 8 is reflected by a reflective mirror 9 to be incident on a relay lens 10. The light beam from the relay lens 10 is then incident on a dichroic prism 11 including a wavelength selecting reflective-transmissive film 11a which serves to reflect or transmit the light beam therethrough depending on the wavelength of the incident beam. For example, the transmitted light beam is reflected by a reflection mirror 12 and then incident on a beam limiting mask 13b whereat information required to detect the optical characteristics of the lens 8 is selected. Thereafter, the light beam is incident on a beam splitting means having a semi-transmissive film 14a, for example, a half-mirror 14 with part of the beam being reflected by the semi-transmissive film 14a to be incident on a line sensor 15 for detection. The other part of the beam is transmitted through the semi-transmissive film 14a to be incident on a line sensor 16 for detection. On the other hand, the light beam reflected by the reflective-transmissive film 11a of the dichroic prism 11 is reflected by the reflective mirror 17 to be incident on a beam limiting mask 13a whereat information required to detect the optical characteristics of the lens 8 is selected. Thereafter, the light beam is incident on a half-mirror 14 with part of the incident beam being reflected by the semi-transmissive film 14a to be incident on the line sensor 16 for detection. The other part of the incident beam is transmitted through the semi-transmissive film 14a to be incident on the line sensor 15 for detection. In the illustrated embodiment, the beam limiting masks 13a and 13b are disposed at the respective positions conjugate with a position MA through the relay lens 10 as if the masks are disposed on the position MA spaced apart from the lens 8 by a distance Δd. Similarly, the line sensors 15 and 16 are also located respectively at the positions conjugate with that of a detection plane D through the relay lens 10. Each of the line sensors 15 and 16 may include a linear type charge coupled device, CCD, solid-state pickup element or the like.

The line sensor 15 and 16 are disposed to intersect with each other in their conjugate plane D.

In the illustrated embodiment, the light beam emitted from the source of light 2a forms the first optical path for measurement defined as follows; the dichroic prism 3→the relay lens 4→the pin-hole 5→the collimator lens 6→the reflection mirror 7→the lens to be tested 8→the reflective mirror 9→the relay lens 10→the dichroic mirror 11→the reflective mirror 17→the mask 13a→the half-mirror 14→the line sensors 15 and 16. On the other hand, the beam of light emitted from the light source 2b forms the second original path for measurement defined as follows; the dichroic prism 3→the relay lens 4→the pin-hole 5→the collimator lens 6→the reflective mirror 7→the lens to be tested 8→the reflective mirror 9→the relay lens 10→the dichroic prism 11→the reflective mirror 12→the mask 13b→the half-mirror 14→the line sensors 15 and 16.

FIGS. 7a and 7b show the mask patterns in the aforementioned beam limiting masks 13a and 13b, respectively.

The mask 13a includes a group 20 which selectively transmit the light beam passed through the lens to be tested 8 and which consisting of plural narrow linear bands 20a, 20b, 20c, 20d, 20e, 20f, 20g, 20h, 20i, 20j, each of which have the same width sloped by an angle $m_2$ and spaced away from and parallel to each other with a pitch p.

At least one linear band of the parallel linear band group 20 is provided as a reference linear band 22 having a different dimension such that it can be distinguished from the other linear bands. These bands 20 serve to transmit the light selectively from the optical system to be tested. A mask base which is illustrated by hatching in FIG. 7a is provided by using a non-transmitting material.

Similarly, the mask 13b includes a group which selectively transmit the light beam passed through the lens to be tested 8 and which consist of plural narrow linear bands 20a, 20b, 20c, 20d, 20e, 20f, 20g, 20h, 20i each of which have the same width inclined by an angle $m_1$ and spaced apart from and parallel to each other with a pitch p, said group having a similar reference linear band 23. The mask base of mask 13b, which is illustrated by hatching in FIG. 7b, is also provided by using a non-transmitting material.

Although the illustrated embodiment of the present invention has been described with respect to the reference linear bands 22 and 23 having different widths (wide width) for distinguishing them from the other linear bands, the present invention is not limited to such an arrangement. For example, the reference linear bands may have different transmission factors or transmissive wavelength characteristics for distinguishing them from the other linear bands. Alternatively, all of the linear band groups are identical with one another except that a pitch is varied at a specific area in the particular group to provide the same function as the reference linear band.

The parallel linear band groups 20 and 21 on the masks 13a and 13b are arranged such that they intersect by an angle θ in the common conjugate plane MA of the masks 13a and 13b through the relay lens 10 shown in FIG. 6, the bisector 24 of said angle being intersected by a reference axis 25 with an angle E. In the illustrated embodiment, the angles θ and ε equal to 90°.

Although the pitch has been selected to be equal to P in both of the parallel linear band groups 20 and 21, this is attained only for more easily manufacturing the masks 13a and 13b. The masks 13a and 13b may have parallel linear band groups having different pitches from each other. Alternatively, one parallel linear band group may include linear bands having different pitches from each other. Furthermore, the angles θ and ε can also be selected optionally.

Figure 8:
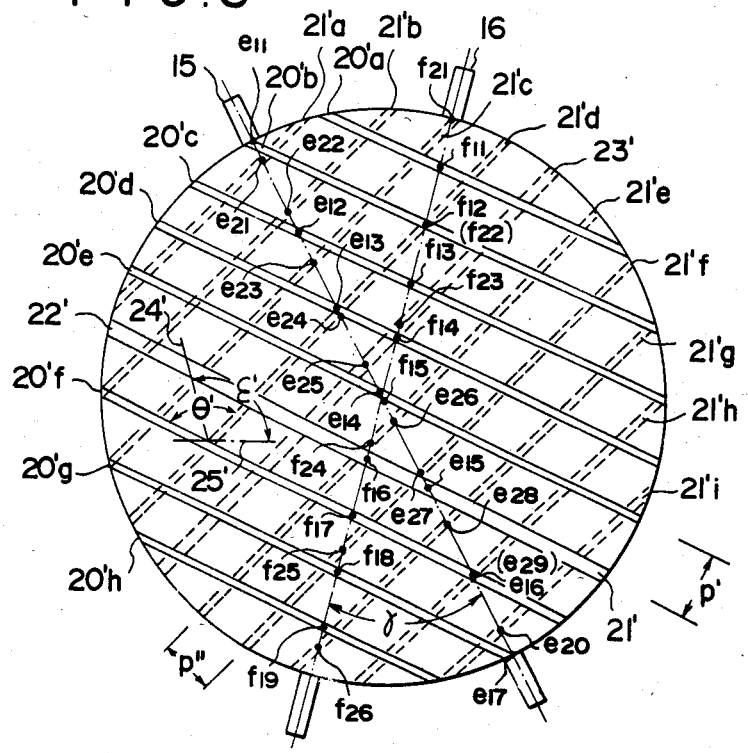
FIG. 8 is a schematic view illustrating the projection and detection of a mask pattern on line sensors.

FIG. 8 is a view showing the projection of the mask band images onto the line sensors when the mask pattern images are detected by the line sensors. As shown in FIG. 8, the line sensors 15 and 16 of FIG. 6 are disposed such that they intersect with each other by an angle γ in the common conjugate plane or detection plane D through the relay lens 10. The light beam including information of the refractive characteristics of the lens to be tested 8 passed through the masks 13a and 13b so that the parallel linear band group 20 on the mask 13a will be projected onto the line sensors 15 and 16 as parallel linear band images $20'a, 20'b \ldots 22' \ldots 20'h$. Similarly, the parallel linear line group 21 on the other mask 13b are projected onto the line sensors as parallel linear pattern images $21'a, 21'b \ldots 23' \ldots 21'i$. After projected, these linear band images have pitches p' and p'' and intersecting angle $\theta$ and angle $\epsilon'$ by which the bisector 24' thereof intersects a reference axis 25'.

On measuring, the light source 2a is first energized to form the first measuring optical path so that the linear band images $20'a, 20'b \ldots 22' \ldots 20'h$ are projected onto the line sensors 15 and 16 through the mask 13a. The line sensor 15 detects the linear band images $20'a, 20'b \ldots 20'h$ as the respective detection points $e_{11}, e_{12} \ldots e_{17}$. Similarly, the line sensor 16 detects the respective detection points $f_{11}, f_{12} \ldots f_{19}$.

Subsequently, the light source 2b is energized to form the second measuring optical path so that the linear band images $21'a, 21'b \ldots 23' \ldots 21'i$ will be projected onto the line sensors 15 and 16 through the mask 13b. The line sensor 15 detects the linear band images $21'a, 21'b \ldots 23' \ldots 21'i$ as the respective detection points $e_{21}, e_{22} \ldots e_{29}, e_{20}$. Similarly, the line sensor 16 detects the respective detection points $f_{21}, f_{22} \ldots f_{26}$.

Figure 9:
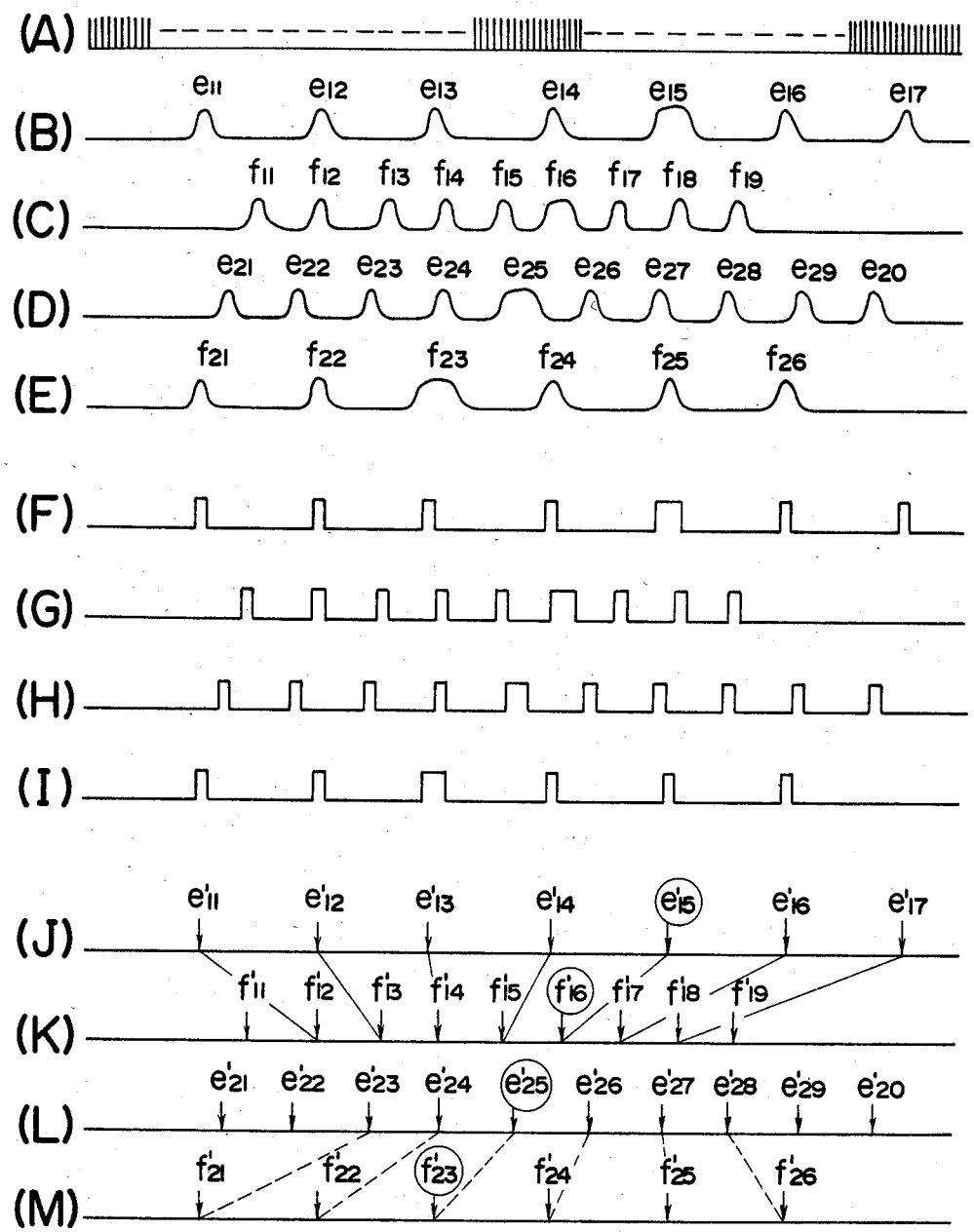
FIGS. 9A-9M are timing charts showing relationships between outputs detected by line sensors and coordinate values.

FIGS. 9A to 9M are timing charts for illustrating the outputs from the line sensors when the linear band images are detected by the line sensors and the subsequent calculations thereof. FIG. 9A shows a series of pulses for reading and driving the detecting outputs of the line sensor. As these pulses are input to the line sensor, the latter generates detection outputs in sequence. FIG. 9B shows waveforms (envelope curves) of detection outputs from the line sensor 15 when the linear band images $20'a, 20'b \ldots 22' \ldots 20'h$ are projected onto the line sensor 15. The output waveforms of FIG. 9B have their leading edges of output levels which correspond to the respective detection points $e_{11}, e_{12} \ldots e_{17}$. Similarly, FIG. 9C shows output waveforms of the linear band images $20'a, 20'b \ldots 20'h$ detected by the line sensor 16, FIG. 9D shows output waveforms of the linear band images $21'a, 21'b \ldots 23' \ldots 21'i$ detected by the line sensor 15, FIG. 9E shows output waveforms of the linear band images $21'a, 21'b \ldots 23' \ldots 21'i$ detected by the line sensor 16. FIGS. 9F-9I show rectangular output waveforms shaped from the aforementioned detected output waveforms (B)-(E) by the use of a Schmitt trigger circuit, with the waveforms (F)-(I) corresponding to the waveforms (B)-(E), respectively. The central positions of the so obtained rectangular output waveforms (F)-(I) are determined and positioned by utilizing the number of the sensor elements in the line sensor.

Figure 10:
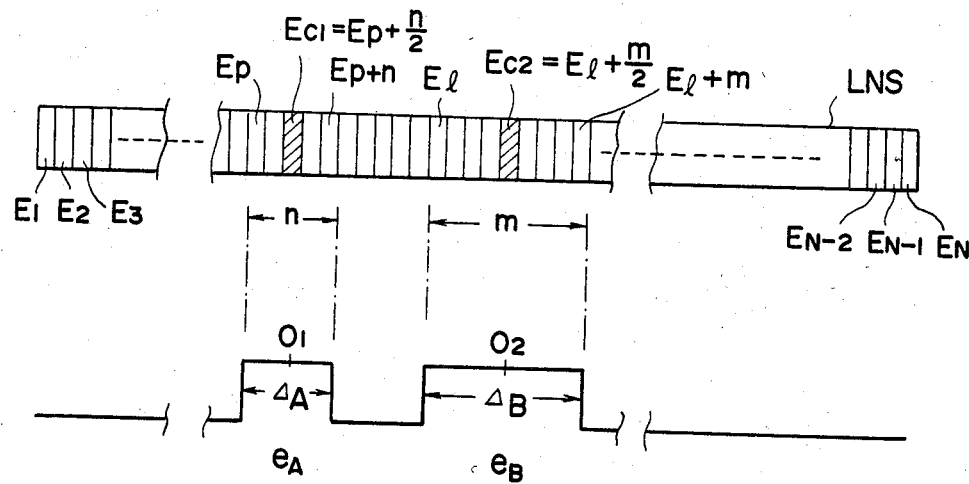
FIG. 10 is an arrangement of line sensor elements for illustrating a process which determines coordinate values from the output detected by the line sensors.

Namely, if a line sensor LNS consists of sensor elements of N in number, $E_1, E_2, \ldots E_{N-1}$ and $E_N$ as shown in FIG. 10 and when the sensor elements $E_p$ to $E_{p+n}$ of this line sensor LNS generate a rectangular waveform output $e_A$ and the sensor elements $E_1$ to $E_{1+m}$ of the same produce a rectangular waveform output $e_B$, the width $\Delta_A$ of the rectangular waveform output $e_A$ corresponds to the sensor elements of n in number while the width $\Delta_B$ of the rectangular waveform output $e_B$ corresponds to the sensor elements of m in number. It is therefore understood that the center $O_1$ of the rectangular waveform output $e_A$ corresponds to the sensor element of $E_p+n/2=E_{c1}$ in number which is offset from the sensor element $E_p$ by n/2. Similarly, the center $O_2$ of the rectangular waveform output $e_B$ corresponds to the sensor element $E_1+m/2=E_{c2}$. In order to increase the accuracy in detection, it is required to provide any interpolation between the pitches of the sensor elements. This can be accomplished by waveform shaping the leading and trailing edges of an output signal precisely at an appropriate slice level after an envelope curve has been detected, and then detecting the center of the output signal by the use of clock pulses having a frequency sufficiently higher than that of the pulse series for driving the line sensors.

In such a manner, the linear band images can be positioned by the number of the sensor elements in the line sensors when the center of the rectangular output waveform obtained by the line sensors at detection points is known. Namely, these images can be obtained as coordinate values in a coordinate system defined by the line sensors.

FIGS. 9J to 9M show the respective detection points as coordinates on the line sensors according to the above method. Coordinate values $e'_{11}, e'_{12} \ldots e'_{17}$ correspond to the detection points $e_{11}, e_{12} \ldots e_{17}$, respectively. Coordinate values $f'_{11}-f'_{19}$ correspond to the detection points $f_{11}-f_{19}$, respectively. Further, coordinate values $e'_{21}-e'_{20}$ correspond to the detection points $e_{21}-e_{20}$, respectively. Still further, coordinate values $f'_{21}-f'_{26}$ correspond to the detection points $f_{21}-f_{26}$, respectively.

Referring again to FIG. 10, the number m of sensor elements for generating the rectangular waveform output $e_B$ is different from the number n of sensor elements for producing the other rectangular waveform output $e_A$. Since the number m is larger than the number n, it is apparent that the rectangular waveform output $e_B$ is a detection output of linear band images from such a reference linear band as shown in FIGS. 7a and 7b. In the illustrated embodiment, the detection points $e_{15}, e_{16}, e_{25}$ and $f_{23}$ correspond to those of reference linear band images 22' and 23', and have the respective reference coordinate values $e'_{15}, f'_{16}, e'_{25}$ and $f'_{23}$.

Thus, an equation for the reference linear band image 22' can be determined from the reference coordinate values $e'_{15}$ and $f'_{16}$, and an equation for the reference linear band image 23' can be established from the reference coordinate valeus $e'_{25}$ and $f'_{23}$. Equations for the other linear band images can be determined from the respective coordinate values ordered by the reference coordinate values $e'_{15}, f'_{16}, e'_{25}$ and $f'_{23}$. For example, by the use of a coordinate value $e'_{16}$ next to the reference coordinate value $e'_{15}$ and a coordinate value $f'_{17}$ of the reference coordinate value $f'_{16}$, an equation for a linear band image $20'f$ can be determined. In such a manner, a plurality of equations for linear band images can be established by the use of the respective coordinate values. Since the linear band images are maintained parallel in the same parallel linear line group, these linear equations can be averaged resulting in more precise detection. Furthermore, the obtained equations can be used to determine the respective pitches P' which are in turn averaged resulting in a more accurate value for the pitch P'. This is an important feature of the present invention.

Figure 12:
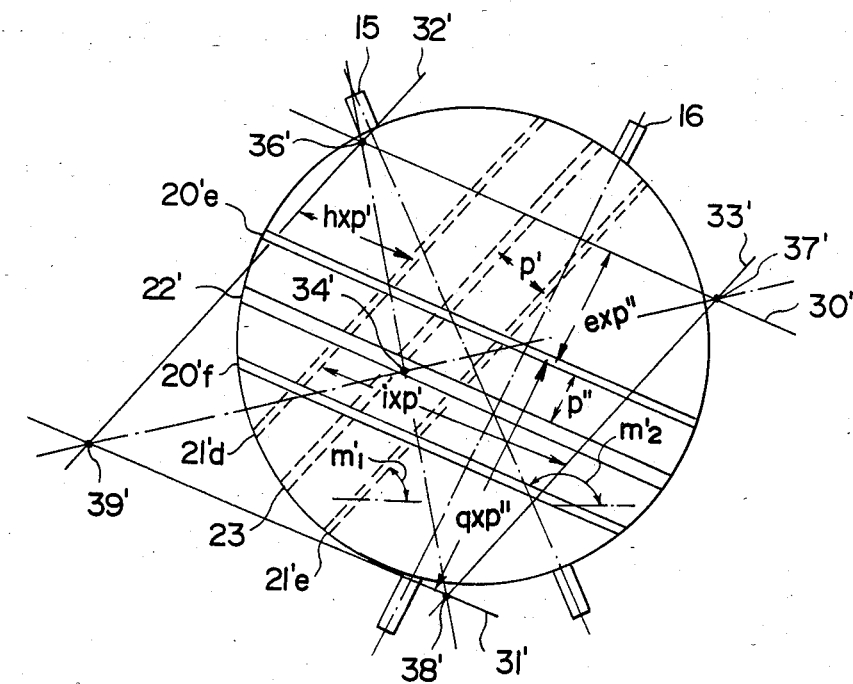
FIGS. 11, 12 and 13 are schematic views illustrating a measurement based on the principle of the present invention.
Figure 11:
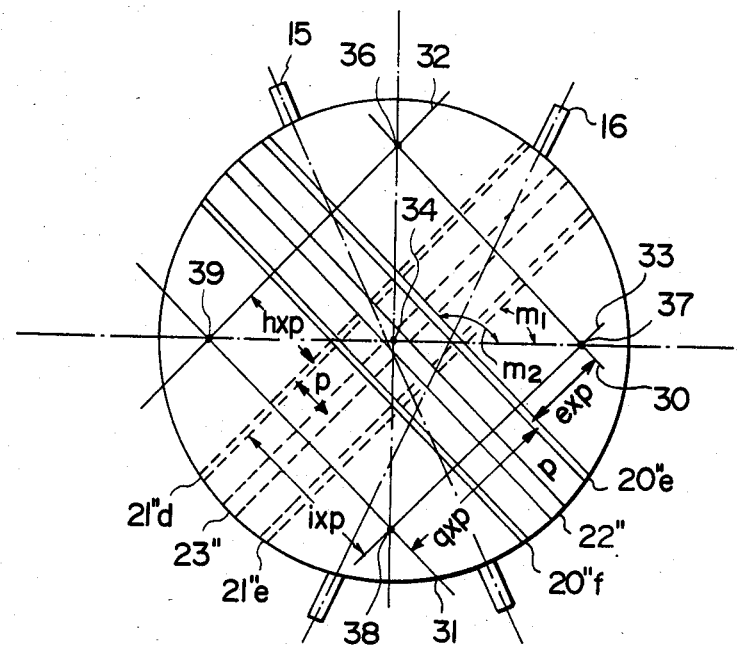
Figure 13:
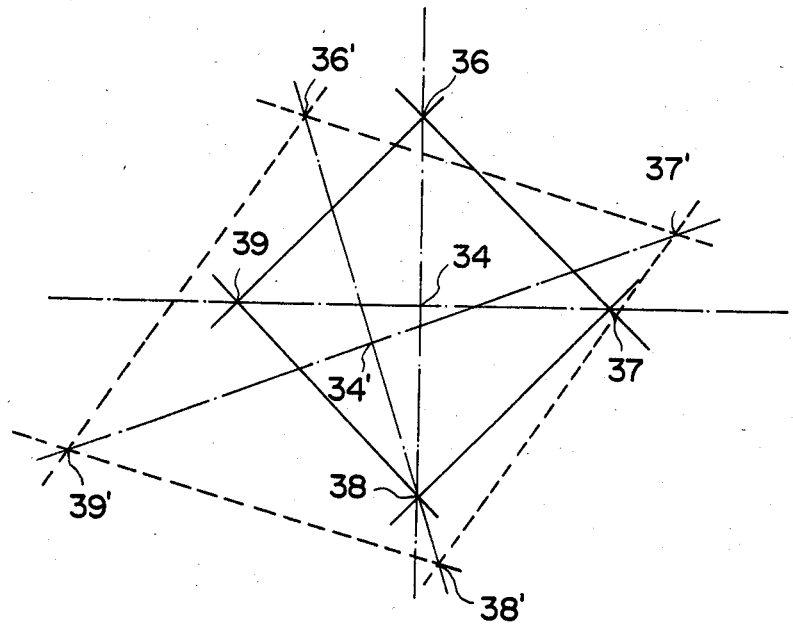

Referring to FIGS. 11 to 13, there will now be described a method in which imaginary linear lines are formed from equations for linear band images detected by the line sensors and used to establish any four points on the same plane as a plane onto which the linear band images are projected, variations of these points being utilized to measure the refractive characteristics of a lens to be tested. FIG. 11 shows the projection of the linear band groups 20 and 21 onto the line sensors 15 and 16 when the lens 8 is not inserted in the measuring optical path. At this time, the linear band group images 20″ and 21″ (only the reference linear band images 22″, 23″ and linear bands 20″$e$, 20″$f$, 21″$d$, 21″$e$ are shown in FIG. 11) have their own equations and pitch P which are determined by the aforementioned method. Subsequently, for example, an imaginary linear line 30 can be produced with an angle $f \times m_2$ at a position spaced away from the linear band image 20″$e$ by a distance $e \times P$. An imaginary linear line 31 can be formed with a angle $f \times m_2$ at a position spaced away from the opposite side of said linear band image 20″$e$ by a distance $g \times P$. Similarly, an imaginary linear line 32 can be formed with an angle $f \times m_1$ at a position spaced apart from the linear band image 21″$d$ by a distance $h \times P$, and an imaginary linear line 33 can be produced with an angle $f \times m_1$ at a position spaced away by a distance $i \times P$. The coefficients e, f, g, h and i can optionally be selected. Normally, the coefficient f is equal to one. Namely, imaginary linear lines will be formed with the same angles as the angles $m_1$ and $m_2$ in the linear pattern image equations. Furthermore, the coefficients e, g, h, and i are selected such that intersections 36, 37, 38 and 39 of the formed imaginary linear lines are located symmetrically relative to the center 24 of the mask. FIG. 11 shows the so formed imaginary linear lines which can be used to more easily calculate the prism refractive power of a lens to be tested as described hereinbefore with the principle of the present invention.

Subsequently a lens to be tested is inserted in the measuring optical path. Linear band images formed by a beam of light which has been changed by the refractive characteristics of the lens to be tested are detected by the line sensors to obtain imaginary linear lines. This is shown in FIG. 12.

As aforementioned, there are first detected linear band group images 20′ and 21′ which have been changed respectively to pitches P′ and P″ and to angles $m_1'$ and $m_2'$ so that equations therefor will be calculated. Subsequently, an imaginary linear line 30′ is formed at a position spaced away from the linear band image 20′$e$ corresponding to the linear pattern image 20″$e$ used in FIG. 11 as a reference, by a distance $e \times P''$ in which e is the same coefficient as used to form the imaginary linear line 30 in FIG. 11. This imaginary linear line 30′ is sloped with an angle $f \times m_2'$ in which the coefficient f is equal to one in the same manner that the coefficient f in the angle $f \times m_2$ of the imaginary linear line 30 in FIG. 11 is equal to one. Similarly, an imaginary linear line 31′ is formed at a position spaced away from the linear band image 20′$e$ by a distance $g \times P''$, an imaginary linear line 32′ is formed at a position spaced away from the linear band image 21′$d$ by a distance $h \times P'$, and an imaginary linear line 33′ is formed at a position $i \times P'$. Intersections 36′, 37′, 38′ and 39′ can be obtained from these imaginary linear lines 30′, 31′, 32′ and 33′ and used to obtain the center 34′ relating to these four intersections.

Thus, the four intersections 36 to 39 are shifted to the other four intersections 36′ to 39′ under the refractive characteristics of a lens to be tested in the detection plane D. This is shown in FIG. 13. The amount of such a shift can be utilized to calculate the refractive characteristics of the lens to be tested by the use of the aforementioned equations (3) to (5). In accordance with such a method as suggested in the illustrated embodiment in which four intersection of imaginary linear lines when a lens to be tested is not inserted in the measuring optical path are used as reference points, and the amount of shift in said intersections when the lens is inserted in the measuring optical path, the aforementioned equations (3) will completely be invariable for the coordinate system formed by two line sensors. Accordingly, there is very advantageous in that no control of intersecting angles and positions of the line sensors will be required in assembling.

Figure 14:
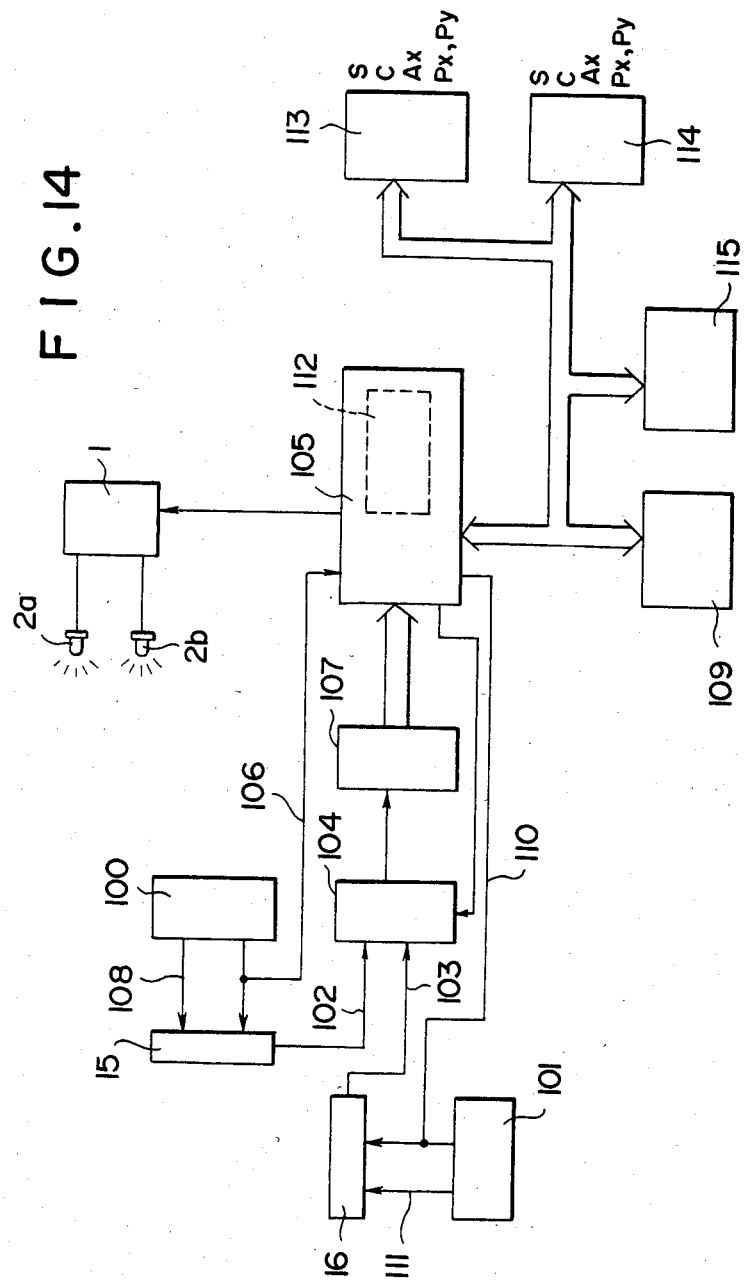
FIG. 14 is a block diagram of an operational circuit.

FIG. 14 shows a simple block diagram of an example of a processing circuit for effecting such a calculation as described above. The line sensors 15 and 16 are driven by line sensor drivers 100 and 101 and detect images which are formed by projecting a beam of light from the light source 2a driven by the drive circuit 1 through the beam limiting mask having the linear band group. Such detection produces output signals as shown in FIGS. 9B, 9C which are transmitted from the line sensors to signal lines 102 and 103. 104 is a analog switch controlled by a microprocessor 105. When the microprocessor 105 is interrupted by a scan start pulse 106 from the driver 100 for the line sensor 15, it is operated to control the analog switch so that the output of the line sensor 15 will be coupled with the input of an A/D converter 107. The A/D converter 107 is adapted to convert an analog output from each element of the line sensors which is read out from the driver circuit 100 by reading pulses as shown in FIG. 9A, to a digital value which is in turn supplied to the microprocessor. The A/D converter 107 is selected such that it has a resolving power in the order of 8 bits (1/256) and a conversion time smaller than the scan frequency of the line sensors. The microprocessor 105 is adapted to read the outputs of the line sensor 15 that have been converted into digitial values at each element and to store them successively in a data memory 109 which is composed of RAM (random access memory) or the like. Consequently, the outputs of the line sensor 15 are stored in the data memory 109 in the form of digital values proceeding from the first element of the line sensor to the subsequent elements thereof rather than predetermined locations (addresses). For example, if the line sensor is comprised of 1728 elements, the microprocessor 105 ceases further data gathering when 1728 data is totally gathered, and waits to receive an interruption by a scan start pulse 110 driving the line sensor 16. As interrupted, the microprocessor 105 begins to control the analog switch 104 to successively store the outputs of the line sensor 16 read out by line sensor reading pulses 111 in the data memroy 109 as degital values. Subsequently, the microprocessor 105 controls the drive circuit 1 to turn off the light source 2a now in action and to turn on the light source 2b. In the same manner, detection outputs shown in FIGS. 9D and 9E are stored in the data memroy 109 as digital values. Thus, all of the measurement data will be stored in the data memory 109. After this, an operational circuit 112 in the microprocessor 105 will achieve the following processes based on the data in the data memory 109:

(1) Detecting which element of the line sensor the center of a line sensor output waveform produced form the projected images of linear band of the beam limiting mask is located at.

(2) Obtaining equations for the respective linear band images in the coordinate system formed by two line sensors.

(3) Forming equations of such imaginary linear lines as shown by 30'-33' in FIG. 12 according to the aforementioned method and obtaining coordinate positions of four intersections 36'-39' of the imaginary linear lines as shown in FIG. 13 to determine its central position 34'.

(4) Determining the spherical refractive power S, Cylindrical refractive power C, orientation of astigmatic axis Ax and prism refractive powers Px, Py of a lens to be tested by the aforementioned equations (3)–(5) based on the four reference positions 36-39 with no lens to be tested, the coordinate position of the center 34 and the coordinate positions of the points 36'-39' and 34' obtained by the aforementioned equation (3).

Further, in this case, the spherical refractive power S is obtained by value $D_1$ of the equation (4) when $D_1 \leq D_2$, or is obtained by value $D_2$ of the equation (4) when $D_1 \geq D_2$. And cylindrical refractive power C is obtained by value $|D_1 - D_2|$ of the equation (4). More further, the orientation of astigmatic axis Ax is equal to Ⓗ of the equation (5). Prisum refractive powers Px, Py are equal to Ph, Pv of the equation (10), respectively.

The values thus obtained are output to an indicator 113 and printer 114 as shown in FIG. 14. The above processes are made all according to programs which are recorded in a program memory 115. Such processes due to the microprocessor can easily be attained by those skilled in the art.

The present invention is not limited to the above embodiments, but includes many modifications a few examples of which will be disclosed hereinafter.

Figure 15:
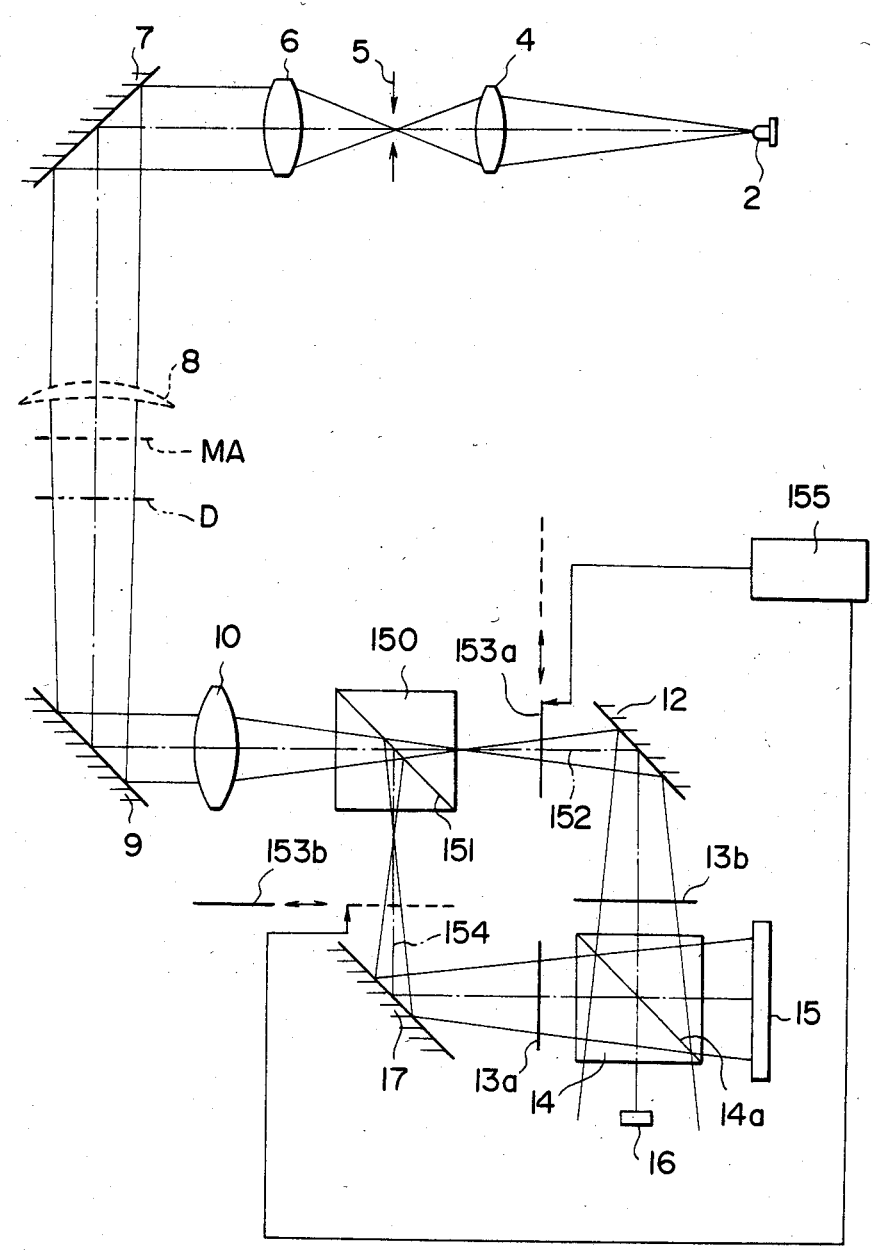
FIG. 15 is a schematic view of the second embodiment of the present invention.

Although the first embodiment shown in FIG. 6 has been described with respect to the formation of two measuring optical paths by the use of a dichroic prism which serves to selectively reflect or transmit two light beams having different wavelengths from two sources of light, the two light sources may be replaced by a mechanical chopper shown in FIG. 15 for selecting the measuring optical paths.

In FIG. 15, the same components as in the first embodiment of FIG. 6 are designated by the same numerals with the explanation thereof being omitted. A beam splitting means 150 such as half-mirror is disposed beyond the relay lens 10 for dividing the light beam from the relay lens 10 into two bundles or rays. One of the bundles of rays passes through a semitransparent mirror face 151 in the half-mirror 150 and follows the first measuring optical path 152 in which the first chopper 153a is disposed. On the other hand, the other bundle of rays is reflected at the semitransparent mirror face 151 of the half-mirror 150 and then follows the second measuring optical path 154 in which the second chopper 153b is located. These first and second choppers are connected with and controlled by a chopper drive circuit 155. The control is made such that if the first chopper 153a is inserted in the first measuring optical path 152, the second chopper 153b is out of the second measuring optical path 154 to permit the light beam passing through the second measuring optical path to be incident only on the mask 13a. The light beam passed through this mask 13a is divided by the half-mirror 14 into two parts which are projected onto the line sensors 15 and 16, respectively.

Subsequently, the chopper drive circuit causes the first chopper 153a to be out of the first measuring optical path and at the same time inserts the second chopper 153b into the second measuring optical path 154 to shut off the light beam proceeding to the second measuring optical path. Accordingly, only the light beam proceeding to the first measuring optical path is reflected by the mask 13b and passes through the same to be divided by the half-mirror 14 into two parts which are projected onto the line sensors, respectively.

Figure 16:
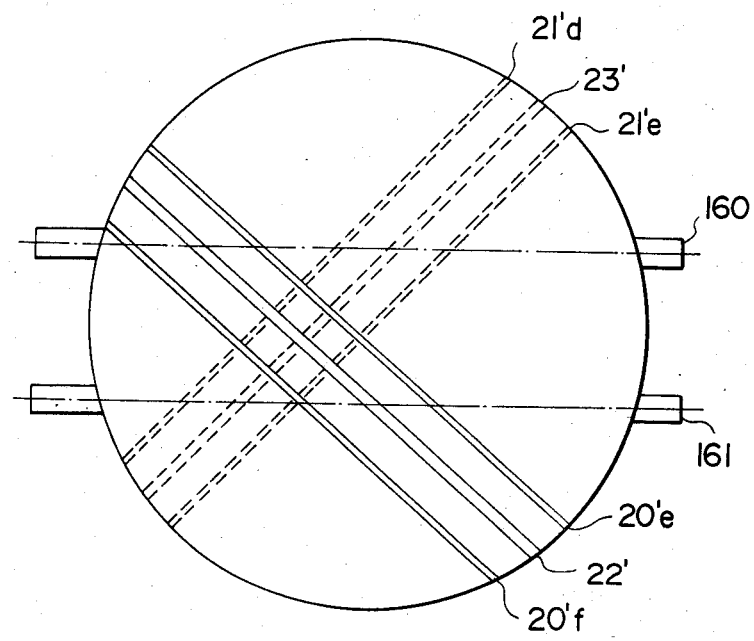
FIG. 16 is a view showing an arrangement of line sensors based on the third embodiment of the present invention.

FIG. 16 shows another embodiment of the arrangement of line sensors. Although the first embodiment of FIG. 6 has been described with respect to the line sensors 15 and 16 being disposed to intersect with each other in the optically conjugate detection plane D through the relay lens 10, the present invention is not limited to such an arrangement. The line sensors may be intersected with each other at their imaginary extensions. As one can see from the principle of the present invention, it includes the first measuring step in which linear equations for projected images of linear bands formed on the beam limiting mask are obtained. The linear equations can be obtained by measuring at least two points on the linear lines. Therefore, the line sensors for detecting the linear band images can freely be located unless they become parallel to the linear band images. FIG. 16 shows an example of such an arrangement in which two line sensors 160 and 161 are disposed parallel to each other in the detection plane D. More particularly, the line sensors 160 and 161 are located parallel to each other in the detection plane D such that the line sensor 160 is placed in the same plane that the line sensor 15 of FIG. 6 is disposed and that the line sensor 161 is located in the same plane as the line sensor 16 of FIG. 6 is positioned.

Figure 17:
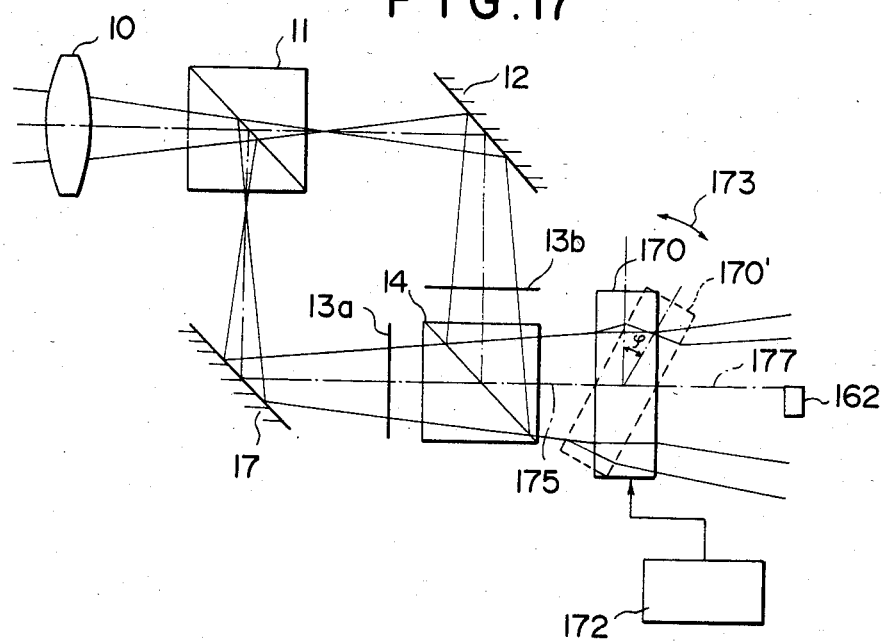
FIG. 17 is a fragmentary schematic view of an optical system which is the fourth embodiment of the present invention.

FIG. 17 shows further embodiment of the present invention in which the two parallel line sensors are replaced by a single line sensor which is combined with image shifting optical means to provide substantially the same advantage as the two line sensors are used. In FIG. 17, the optical arrangement forwardly of the relay lens 10 is the same as that of FIG. 6 and therefore omitted. The same components as in the first embodiment of FIG. 6 are denoted by the same numerals with the explanation thereof being eliminated. Forwardly of a single line sensor 162 is located image shifting optical means 170 such as plane-parallel which is perpendicular to the incident optical axis and includes a rotating axis parallel to a direction in which the sensor elements of the line sensor are disposed. The plane-parallels 170 are rotated by a drive circuit 172 around said rotating axis by an angle in a direction shown by an arrow 173, these plane-parallels being moved in synchronism with each other.

Assuming that the plane-parallel 170 are positioned perpendicular to the incident optical axis 175 as shown by a solid line in FIG. 17, a beam of light, which has been passed through the mask 13a in the second measuring optical path and transmitted through the semitransparent mirror face of the half-mirror 14, is projected onto the line sensor 162 as a projection light beam which has a projection optical axis 177 coaxially of the incident axis 175. When the driver circuit 172 is then energized, the plane-parallel 170 is rotated by an angle to a position 170' so that the projected light beam will be shifted under the refractive action of the plane-parallel and projected onto the line sensor 162 as a projected light beam which has the second projection optical axis 177' offset parallel from the projection optical axis 177. It is of course that the light beam passed through the mask 13b in the first measuring optical path is similarly processed after it has been reflected by the half-mirror 14. If a two-dimensional sensor is used in place of the line sensors shown in FIGS. 16 and 17, the number of detection point may be increased.

Figure 18:
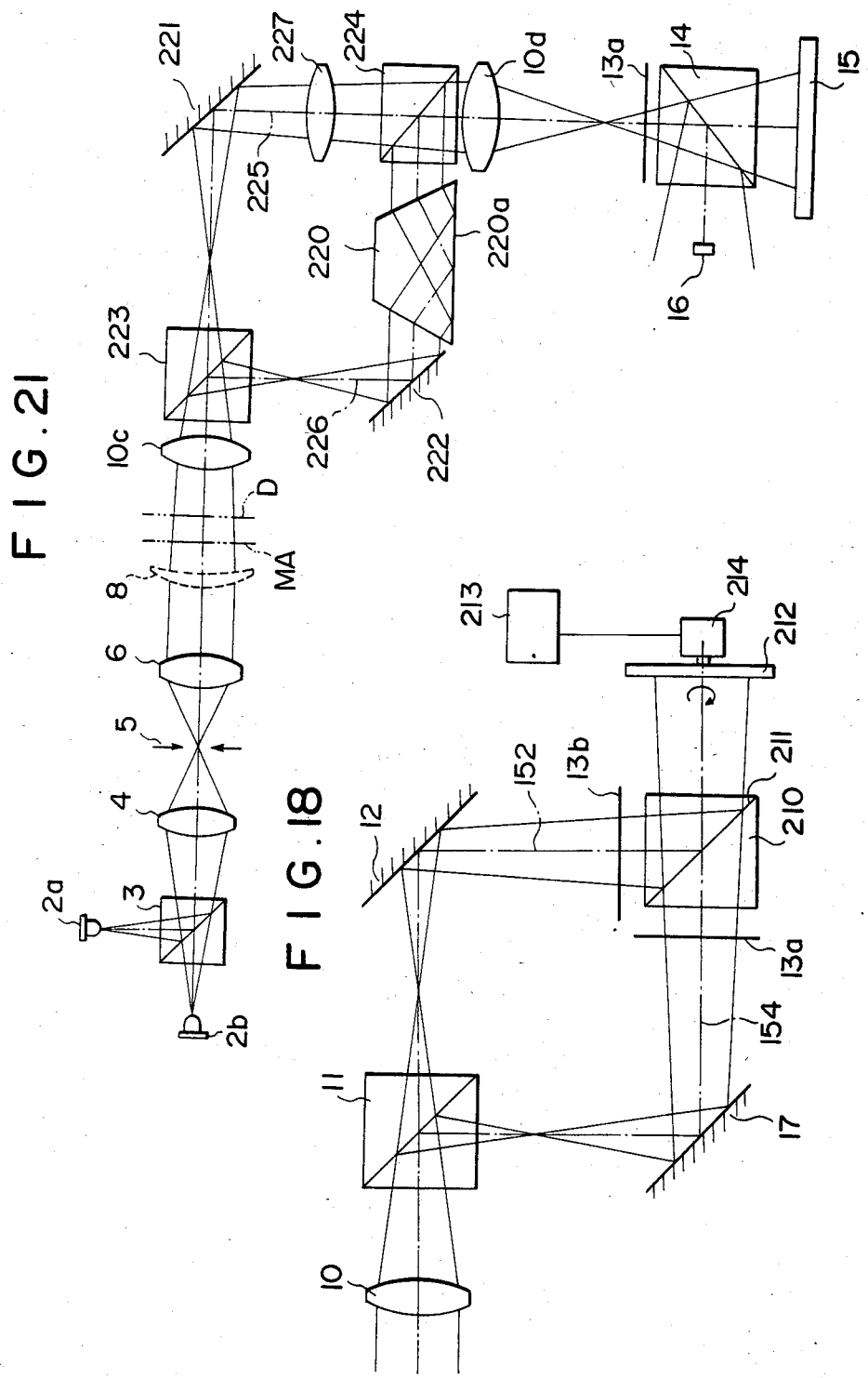
FIG. 18 is a fragmentary schematic view of an optical system which is the fifth embodiment of the present invention.

FIG. 18 shows still further embodiment of the present invention in which a single line sensor may be moved in the detection plane rather than stationary line sensors as in the previous embodiments. The same components as those of the previous embodiments are designated by the same numerals with the explanation thereof being omitted.

A light beam passed through the mask 13b in the first measuring optical path 152 is reflected by a reflective film 211 of a dichroic prism 210 which causes the light beam to selectively reflect or transmit depending on its wavelength and then incident on a line sensor 212. This line sensor 212 is now set at an angle by a motor 214 in accordance with a command signal from a sensor rotational angle controlling circuit 213. At this set angle, the sensor effects the first detection. After the line sensor has been rotated to another angle, the second detection is carried out by the sensor. At subsequent angular positions, the respective detections are effected. These results detected are used to calculate projected images of the linear band of the mask 13b. Next, the source of light is exchanged to the other source of light to cause the measuring beam to pass through the mask 13a in the second measuring optical path 154. The light beam passed through the mask 13a is caused to be transmitted through a reflective film 212 of a dichroic prism 210 and then to be incident on the line sensor 212 for detection as in the previous embodiments.

The single line sensor may be parallel moved continuously or stepwise in a plane rather than rotated. Alternatively, the single line sensor may be stationary, but the projected light beams may be rotated or parallel-moved continuously or stepwise by rotating the conventional optical image rotator or continuously rotating the plane-parallels. At this case, the image rotator or plane-parallels must be located between the mask and the line sensor.

Two-dimensional plane sensor may be used in place of the line sensors. Thus, more detection points may be detected to improve the accuracy in measuring.

Figure 7:
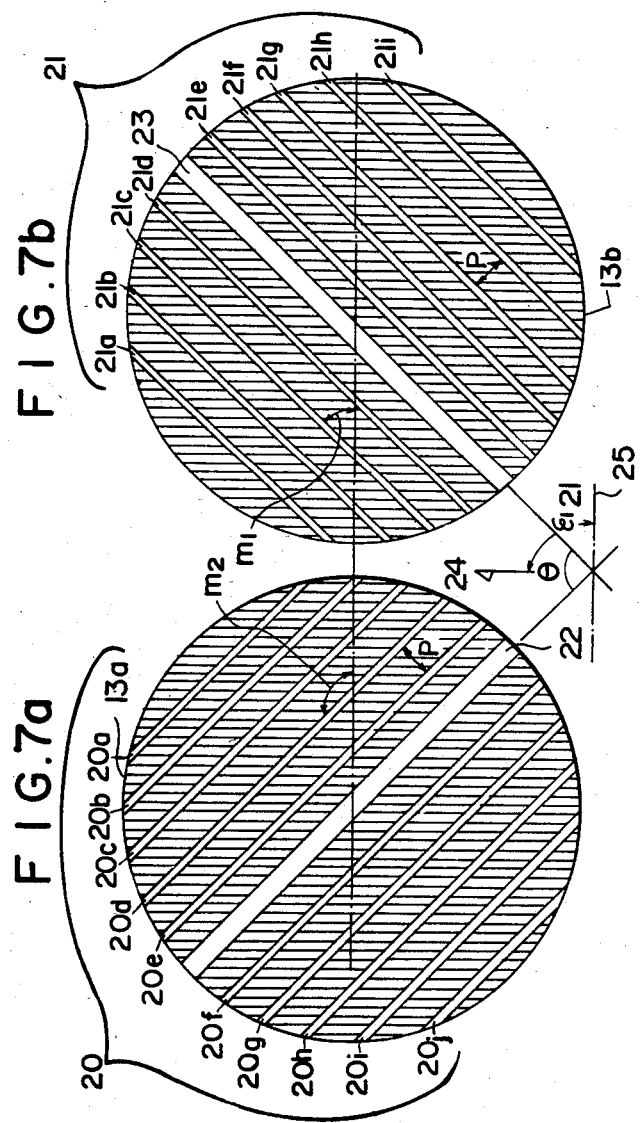
FIGS. 7a and 7b are front elevational views showing examples of the mask pattern.
Figure 19:
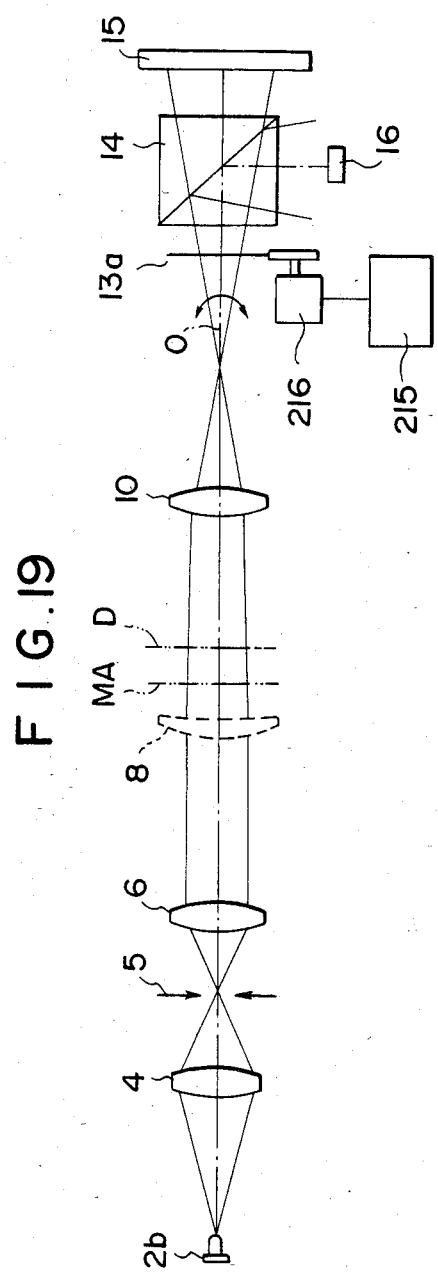
FIG. 19 is a view showing an optical arrangement which is the sixth embodiment of the present invention.
Figure 20:
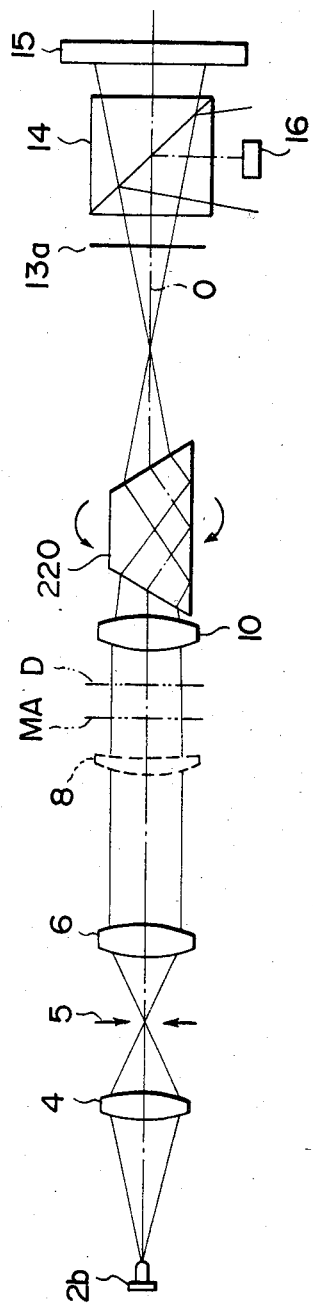
FIG. 20 is a view showing an optical arrangement which is the seventh embodiment of the present invention.

FIGS. 19, 20 and 21 show other embodiment of the present invention in which a single group of parallel linear line pattern is formed on a single mask means which is disposed rearwardly of a lens to be tested, a light beam passed through the lens being caused to be incident on the mask means such that the orientation of the linear band group is changed relative to itself at at least two placed so that the same advantages as in the previous embodiments will be provided, although the embodiments in FIGS. 6, 7 and 8 have been described with reference to the groups of parallel linear bands which are disposed on separate mask means such that the orientations of the linear band groups are different from each other.

FIG. 19 shows an example in which mask means is adapted to be rotated relative to a light beam passed through a lens to be tested. In FIG. 19, a light beam passed through a lens to be tested is incident on mask means through the relay lens 10. Such mask means includes a plurality of parallel patterns as in the mask 13a shown in FIG. 7a which are arranged along a single orientation. This mask means 13a is located in the optical path to provide a predetermined orientation. The light beam passed through this mask means 13a is divided by the half-mirror 14 into two parts which are in turn incident on the line sensors 15 and 16 for detection as in the previous embodiments. Subsequently, the mask 13a is rotated around the measuring optical axis O by a predetermined angle by means of a pulse motor 216 which can be controlled by a motor drive controller 215. Thereafter, another light beam from the lens 8 is caused to be again incident on this mask 13a and then similarly detected by the line sensors 15 and 16.

FIG. 20 shows other embodiment of the present invention in which mask means is fixed whereas a light beam passed through a lens to be tested is rotated around a measuring optical axis O. For this end, the passed light beam is incident on any beam rotating means such as the conventional image rotator 220 which may be rotated. The light beam passed through the lens 8 passes through the relay lens 10 and then is rotated through the image rotator which has been disposed with a predetermined angle. Thereafter, the passed light beam passes through the stationary mask 13a and then is detected similarly by the line sensors 15 and 16. Subsequently, the image rotator is rotated over a predetermined angle at which another light beam passed through the lens passes through the rotated image rotator and is rotated over another angle different from the previous angle to be incident on the mask 13a. The incident light beam is detected by the line sensors 15 and 16.

There is probability that accuracy in measurement may be reduced since such movable parts as the mask means and image rotator are used as in the sixth and seventh embodiments. This can be overcome by the use of such a construction as in the eighth embodiment shown in FIG. 21. In the eighth embodiment, the first and second relay lenses 10c and 10d are located behind the lens 8 to be tested to cooperate with each other for relaying an incident beam of light. Between the relay lenses 10c and 10d there are disposed two dichroic prisms 223 and 224 for selectively reflecting or transmitting the incident light beam depending on its wavelength, and reflective mirrors 221 and 222. Thus, the first measuring optical path 225 is defined by the relay lens 10c, the dichroic prism 223, the reflective mirror 221, the dichroic prism 224 and the relay lens 10d. In the first measuring optical path is disposed an optical length compensation lens 227. Further, the second measuring optical path 226 is defined by the relay lens 10c, the dichroic prism 223, the reflective mirror 222, the dichroic prism 224, and the relay lens 10d. Between the reflective mirror 222 and dichroic prism 224 of the second measuring optical path 226 there is fixedly located an image rotator 220 having its reflective surface 220a which has previously been rotated around the measuring optical axis O by a predetermined angle.

A beam of light emitted from the source of light 2b is first transmitted through the dichroic prism 3 and then passes through a lens to be tested 8 to be incident on the relay lens 10c, the light beam from the relay lens 10c passes through the prism 223 and follows said first optical path 225 to be incident on the mask 13a. The light beam from the mask 13a is detected by the line sensors 15 and 16. Subsequently, the light source 2b is switched to the other light source 2a having different wavelength of light from that of the light source 2b. A beam of light emitted from the light source 2a is reflected by the prism 3 and then incident on the lens 8 to be tested. The light beam from the lens 8 passes through the relay lens 10c and then is reflected by the prism 223 so that it will follow said second measuring optical path 226 to be incident on the mask 13a. The light beam incident on the mask 13a is rotated by a predetermined angle under the action of the image rotator 220. Thereafter, the light beam from the mask 13a is detected by the line sensors 15 and 16 in the same manner as in the previous embodiments.

Figure 22:
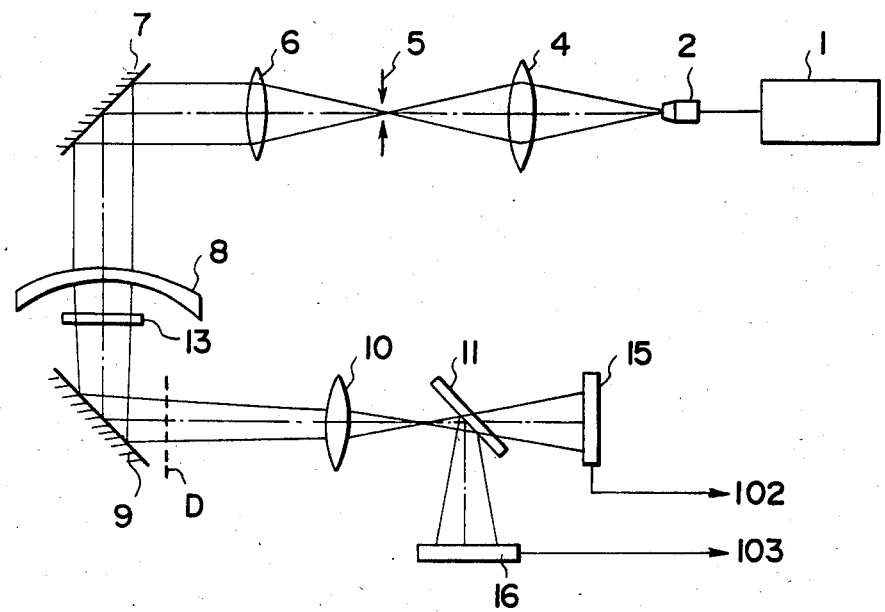
FIG. 22 is an optical arrangement of the ninth embodiment of the present invention.
Figure 23:
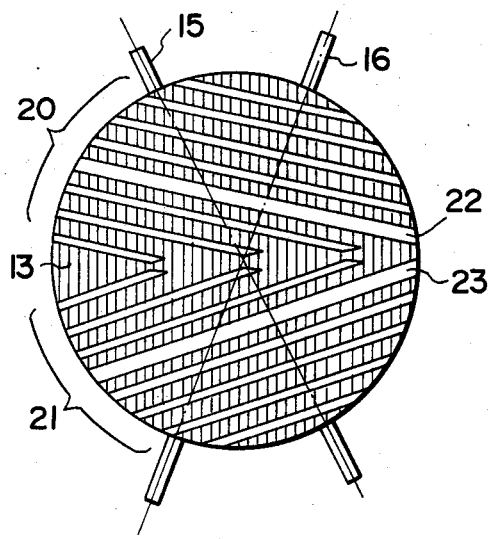
FIG. 23 is a view showing a relationship between the mask pattern of the ninth embodiment and line sensors.
Figure 24:
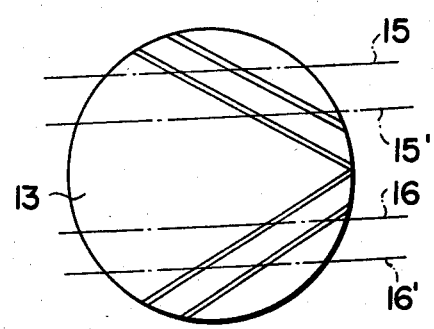
FIG. 24 is a schematic view of a relationship between the mask pattern in the tenth embodiment of the present invention and line sensors.

FIG. 22 shows the nineth embodiment of the present invention in which both the first and second parallel linear band groups are formed on the same mask. The same components as in the first embodiment of FIG. 6 are denoted by the same numerals with the explanation thereof being eliminated. Behind the lens to be tested 8 there is disposed a mask 13 including the first and second parallel linear band groups 20 and 21 which are formed on the mask to have different orientations without any intersection as shown in FIG. 23. The line sensors 15 and 16 are located to intersect with each other in the conjugate detection plane D shown in FIG. 22 through the relay lens 10 and the half-mirror 11, respectively. The processes for obtaining the detection of the line sensors 15 and 16 and for calculating the optical characteristics of a lens to be tested from the so obtained results are similar to those of the previously described embodiments. In the ninth embodiment, however, the patterns corresponding to the first and second parallel linear band groups 20, 21 are simultaneously projected on the line sensors 15 and 16. This is advantageous in that each of the line sensors 15 and 16 may be scanned and detected only once. Where the mask shown in FIG. 23 is utilized to use the parallel disposed line sensors or the beam shifting means as in FIGS. 16 and 17, four line sensors 15, 15', 16 and 16' should be disposed parallel to one another as shown in FIG. 24, or otherwise two line sensors 15 and 16 should be located parallel to the beam shifting means 170 (see FIG. 17).

Although the present invention has been described with respect to the embodiments thereof all of which utilize CCD as line sensors, it is not limited to such CCD, but applicable to such techniques that a pickup tube is utilized to optically scan or that a linear scanning is optically or mechanically made by the use of a photoelectric light emitting element.

Although the present invention has been described with respect to the mask means having a transmissive pattern which serves to selectively transmit the light beam passed through a lens to be tested, as means for selecting the light means, it is not limited to such an arrangement. According to the present invention, there can be formed a reflective pattern for selectively reflecting the passed light beam to detect it by the detectors.

The present invention is not limited to the constructions of the embodiments thereof, but can be carried out in many configurations and arrangements including various combinations of each of the embodiments and various replacement of the components with other equivalents, without departing from the spirit and scope of the invention defined in the appended claims.

What is claimed is:

1. An apparatus for measuring the optical characteristics of an optical system, comprising a light source, collimator means for collimating a beam of light from said light source, a mask for selecting part of the light beam from said collimator means, means for holding an optical system to be tested between said collimator means and said mask, a detector for detecting the selected light beam transmitted by said mask, and a calculator for calculating the optical characteristics of said optical system to be tested on the basis of the results detected by said detector, wherein said mask includes a beam selecting pattern comprising two groups of parallel linear bands, each of said groups consisting of at least two parallel linear lines, said two groups being oriented in different directions and arranged without any intersection.

2. An apparatus as defined in claim 1 characterized in that each of said groups includes at least one linear reference band which can be discriminated from the other linear bands.

3. An apparatus as defined in claim 2 characterized in that each of said groups serves to selectively transmit the light beam passed through said optical system to be tested.

4. An apparatus as defined in claim 1 characterized in that said detector includes at least one line sensor and that said apparatus comprises drive means for producing a relative movement between the selected light beam from said mask and said line sensor in a plane perpendicular to a measuring optical axis.

5. An apparatus as defined in claim 1 characterized in that said detector includes two line sensors, the first of said line sensors being disposed in a plane perpendicular to a measuring optical axis and the second line sensor being located in a plane perpendicular to an optical axis changed by an optical path changing member which is arranged between the first line sensor and said mask, and wherein the first and second line sensors intersect optically.

6. An apparatus as defined in claim 1 characterized in that said calculator is adapted to calculate an equation for projected linear bands of a projected pattern corresponding to said beam selecting pattern on the basis of the results obtained by said detector, said equation being used to determine changes in the inclination and pitch of the parallel linear bands of said groups for obtaining the optical characteristics of said optical system to be tested.

7. An apparatus as defined in claim 6 characterized in that said calculator is adapted to form an imaginary parallelogram based on the bands of said groups, whereby the optical characteristics of said optical system to be tested are calculated based on a difference between said imaginary parallelogram formed without said optical system to be tested in a measuring optical path and said imaginary parallelogram formed with said optical system to be tested in said measuring optical path.

8. An apparatus as defined in claim 1 characterized in that the said parallel linear bands of said groups are disposed symmetrically relative to each other with respect to a plane including a measuring optical axis.

9. An apparatus for measuring the optical characteristics of an optical system, comprising a light source, collimator means for collimating a beam of light from said light source, mask means for selecting part of said collimated beam of light from said collimator means, means for holding an optical system to be tested between said collimator means and said mask means, a detector for detecting the light beam selected in said mask means, a calculator for calculating the optical characteristics of said optical system to be tested on the basis of the results detected by said detector, and first beam splitting means for dividing the light beam from said optical system to be tested into at least two optical paths, said mask means including at least one mask provided in each of said optical paths and having a linear band group consisting of at least two parallel linear bands, said masks being disposed to provide different orientations for said linear bands in the masks.

10. An apparatus as defined in claim 9 characterized in that each of said groups serves to selectively transmit the light beam passed through said optical system to be tested and includes at least one reference linear band which can be discriminated from the other linear bands.

11. An apparatus as defined in claim 9 including a second beam splitting means disposed behind each of said masks, said second beam splitting means being adapted to divide the light beam passed through said masks into at least two parts, each of which is in turn incident on a corresponding detector.

12. An apparatus as defined in claim 9 characterized in that said detector comprises at least two line sensors for linearly scanning and detecting light information.

13. An apparatus as defined in claim 12 characterized in that at least two of said line sensors intersect in a detection plane which is defined by a relay optical system located between said optical system to be tested and said first beam splitting means and which is optically conjugate with said line sensors.

14. An apparatus as defined in claim 12 characterized in that said line sensors are located parallel to each other in a detection plane which is defined by a relay optical system disposed between said optical system to be tested and said first beam splitting means and which is optically conjugate with said line sensors.

15. An apparatus as defined in claim 9 characterized in that said detector includes a two-dimensional sensor.

16. An apparatus as defined in claim 15 characterized in that said light source emits light having at least two different wavelengths and said first beam splitting means is adapted to selectively reflect or transmit the light beam from said light source depending on its wavelength.

17. An apparatus as defined in claim 16 characterized in that said detector is adapted to detect at least two points on the respective projected image of said linear band and said calculator is adapted to derive a linear equation for the projected image of said linear band from the results detected by said detecting means, said equation being utilized to calculate change in the inclination and pitch of the projected image to obtain the optical characteristics of said optical system to be tested.

18. An apparatus as defined in claim 17 characterized in that the calculator is adapted to form an imaginary parallelogram on the basis of the inclination and pitch of said projected image, said imaginary parallelogram being utilized to calculate the optical characteristics of said optical system to be tested based on a difference between said imaginary parallelogram formed without said optical system to be tested in a measuring optical path and said imaginary parallelogram formed with said optical system to be tested in said measuring optical path.

19. An apparatus as defined in claim 18 characterized in that said two-dimensional sensor consists of a charge-coupled device 20. An apparatus as defined in claim 15 characterized in that each optical path split by said first beam splitting means includes means for blocking light oppositely and alternately.

21. An apparatus as defined in claim 20 characterized in that said detector is adapted to detect at least two points on the respective projected image of said linear band and said calculator is adapted to derive a linear equation for the projected image of said linear band from the results detected by said detector, said equation being utilized to calculate change in the inclination and pitch of the projected image to obtain the optical characteristics of said optical system to be tested.

22. An apparatus as defined in claim 21 characterized in that said calculator is adapted to form an imaginary parallelogram on the basis of the inclination and pitch of said projected image, said imaginary parallelogram being utilized to calculate the optical characteristics of said optical system to be tested based on a difference between said imaginary parallelogram formed without said optical system to be tested in a measuring optical path and said imaginary parallelogram formed with said optical system to be tested in said measuring optical path.

23. An apparatus as defined in claim 22 characterized in that said two-dimensional sensor consists of a charge-coupled device.

24. An apparatus as defined in claim 9 characterized in that said light source comprises at least two sources of light having different wavelengths and that said first beam splitting means is adapted to selectively reflect or transmit the light beam from said light source depending on its wavelength.

25. An apparatus as defined in claim 9 characterized in that each optical path split by said first beam splitting means includes means for blocking the beam of light oppositely and alternately.

26. An apparatus as defined in claim 25 characterized in that said detector is adapted to detect at least two points on the respective projected image of said linear band and said calculating means is adapted to derive a linear equation for the projected image of said linear band from the results detected by said detecting means, said equation being utilized to calculate change in the inclination and pitch of the projected image to obtain the optical characteristics of said optical system to be tested.

27. An apparatus as defined in claim 26 characterized in that said calculator is adapted to form an imaginary parallelogram on the basis of the inclination and pitch of said projected image, said imaginary parallelogram being utilized to calculate the optical characteristics of said optical system to be tested based on a difference between said imaginary parallelogram formed without said optical system to be tested in a measuring optical path and said imaginary parallelogram formed with said optical system to be tested in said measuring optical path.

28. An apparatus as defined in claim 27 characterized in that said detector comprises at least two line sensors, wherein each line sensor consists of a charge-coupled device.

29. An apparatus as defined in claim 9 characterized in that said detector is adapted to detect at least two points on a respective projected image of said linear band, and said calculator is adapted to derive a linear equation for the projected image of said linear band from the results detected by said detector, said equation being utilized to calculate changes in the inclination and pitch of the projected image to obtain the optical characteristics of said optical system to be tested.

30. An apparatus as defined in claim 29 characterized in that said calculator is adapted to form an imaginary parallelogram on the basis of the inclination and pitch of said projected image and said imaginary parallelogram is utilized to calculate the optical characteristics of said optical system to be tested based on a difference between said imaginary parallelogram formed without said optical system to be tested in a measuring optical path and said imaginary parallelogram formed with said optical system to be tested in said measuring optical path.

31. An apparatus as defined in claim 30 characterized in that said detector includes a charge-coupled device.

32. An apparatus for measuring the optical characteristics of an optical system comprising a light source, collimator means for collimating a beam of light from said light source, a mask for selecting part of said light beam from said collimator means, means for holding an optical system to be tested between said collimator means and said mask, a detector for detecting the selected light beam from said mask, and a calculator for calculating the optical characteristics of said optical system to be tested on the basis of the results detected by said detector, said apparatus further comprising rotator means for producing a relative rotation between said light beam emitted from said optical system to be tested and said mask in a plane intersecting with a measuring optical path, wherein said mask includes linear band groups consisting of at least two parallel linear bands.

33. An apparatus as defined in claim 32 characterized in that said linear band groups serve to selectively transmit the light beam passed through said optical system to be tested and include at least one reference linear band which can be discriminated from the other linear bands.

34. An apparatus as defined in claim 33 characterized in that said rotator means is adapted to rotate said mask around a measuring optical axis of said measuring optical path.

35. An apparatus as defined in claim 33 characterized in that said rotator means is adapted to optically rotate the light beam emitted from an optical system to be tested around said measuring optical axis of said measuring optical path.

36. An apparatus as defined in claim 35 characterized in that the light beam emitted from said optical system to be tested is split into at least two optical paths, at least one of said optical paths including said beam rotator means disposed therein.

37. An apparatus as defined in claim 32, 33, 34, 35, or 36 characterized in that said detector includes at least two line sensors for linearly scanning and detecting light information.

38. An apparatus as defined in claim 32 characterized in that said detector is adapted to detect at least two points on the respective projected image of said linear band, the so obtained results being utilized to derive a linear equation relating to said linear pattern projected image, said equation being used to obtain changes in the inclination and pitch of the projected image for calculating the optical characteristics of said optical system to be tested.

39. An apparatus as defined in claim 38 characterized in that said calculator is adapted to form an imaginary parallelogram on the basis of the inclination and pitch of projected image of said linear band, said imaginary parallelogram being utilized to calculate the optical characteristics of said optical system to be tested based on a difference between said imaginary parallelogram formed without said optical system to be tested in a measuring optical path and said imaginary parallelogram formed with said optical system to be tested in said measuring optical path.

* * * * *

UNITED STATES PATENT AND TRADEMARK OFFICE
CERTIFICATE OF CORRECTION

PATENT NO. : 4,601,575

DATED : July 22, 1986

INVENTOR(S) : Hiroshi Tamaki

It is certified that error appears in the above-identified patent and that said Letters Patent is hereby corrected as shown below:

Column 24, line 42, before "bands" insert --inclination and pitch of the parallel linear--; and
Column 24, line 51, delete "said" (first occurrence).

Signed and Sealed this

Third Day of February, 1987

Attest:

DONALD J. QUIGG

Attesting Officer

Commissioner of Patents and Trademarks